United States Patent [19]

Astle et al.

[11] 4,234,890
[45] Nov. 18, 1980

[54] AUTOMATIC SETUP SYSTEM FOR TELEVISION CAMERAS

[75] Inventors: Brian Astle, Princeton; Robert A. Dischert, Burlington, both of N.J.

[73] Assignee: RCA Corporation, New York, N.Y.

[21] Appl. No.: 24,737

[22] PCT Filed: Feb. 22, 1979

[86] PCT No.: PCT/US79/00099

§ 371 Date: Feb. 22, 1979

§ 102(e) Date: Feb. 22, 1979

[87] PCT Pub. No.: WO79/00717

PCT Pub. Date: Oct. 4, 1979

[30] Foreign Application Priority Data

Mar. 6, 1978 [GB] United Kingdom ............... 08836/78

[51] Int. Cl.³ ............... H04N 9/62; H04N 9/04; H04N 5/24
[52] U.S. Cl. ............... 358/10; 358/29; 358/51; 358/139; 358/163; 358/170; 358/185; 358/209; 358/221
[58] Field of Search ............... 358/10, 21, 29, 41, 358/51, 139, 160, 163, 170, 185, 209, 221

[56] References Cited

U.S. PATENT DOCUMENTS

| | | |
|---|---|---|
| 3,555,181 | 1/1971 | Thommen ............... 178/7.2 |
| 3,700,789 | 10/1972 | Ryley et al. ............... 358/51 |
| 3,838,310 | 9/1974 | Varian ............... 315/13 R |
| 3,872,499 | 3/1975 | McConnell et al. ............... 358/51 |
| 3,902,011 | 8/1975 | Pieters et al. ............... 358/163 |
| 3,987,482 | 10/1976 | Robers ............... 358/51 |

Primary Examiner—Robert L. Richardson
Attorney, Agent, or Firm—Eugene M. Whitacre; Paul J. Rasmussen; Robert L. Troike

[57] ABSTRACT

A system is described for automatic adjustment of a color television camera for correcting for geometrical errors in the raster and amplitude errors in the video. The system includes means for measuring the errors, positions, or amplitudes of the camera output signals at different locations of the red, green, and blue rasters for simultaneously providing detected signals representing the detected error positions or amplitudes of these locations to a signal processing means. The processing means selectively and separately processes said detected signals according to a plurality of algorithms for producing a plurality of correction signals. The correction signals are applied to the camera for adjusting the camera according to all of the correction signals before remeasuring the rasters.

17 Claims, 20 Drawing Figures

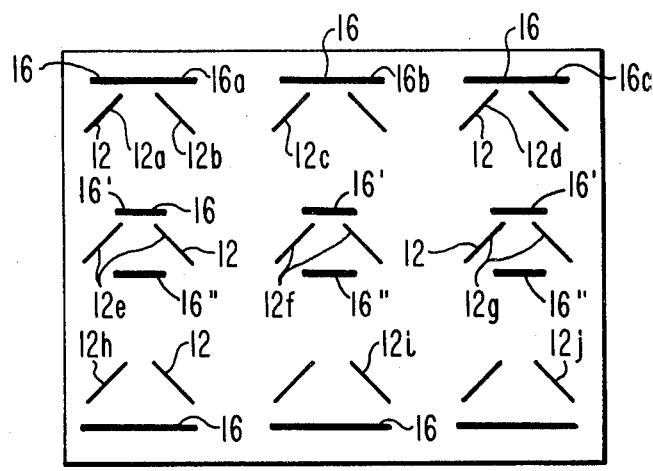
Fig. 2.
Fig. 3.
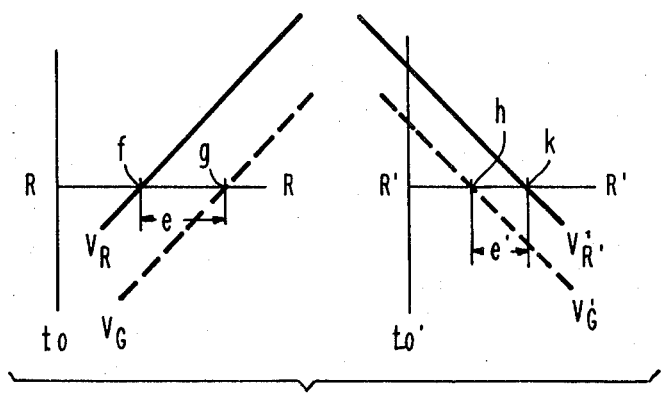
Fig. 5.

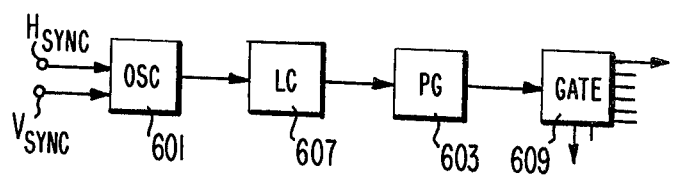
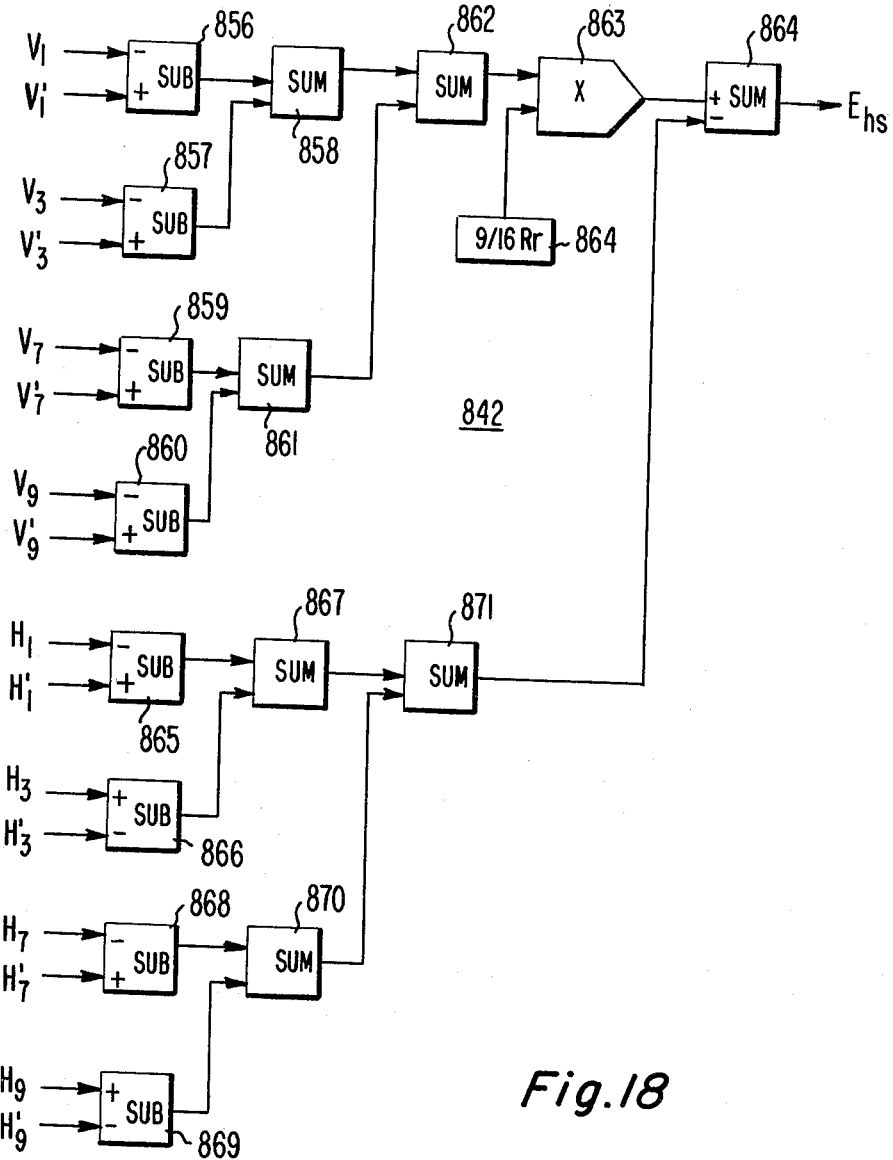
Fig. 7
Fig. 18

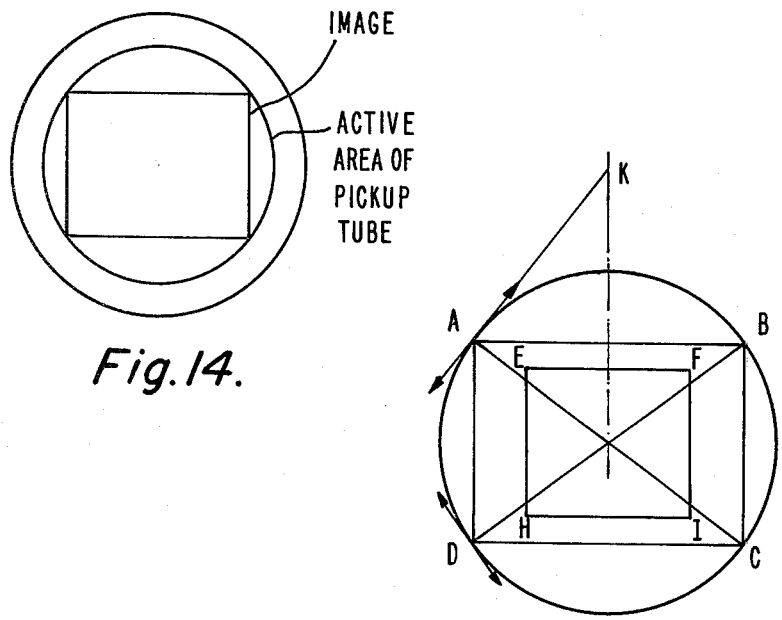
Fig.14.
Fig.15.
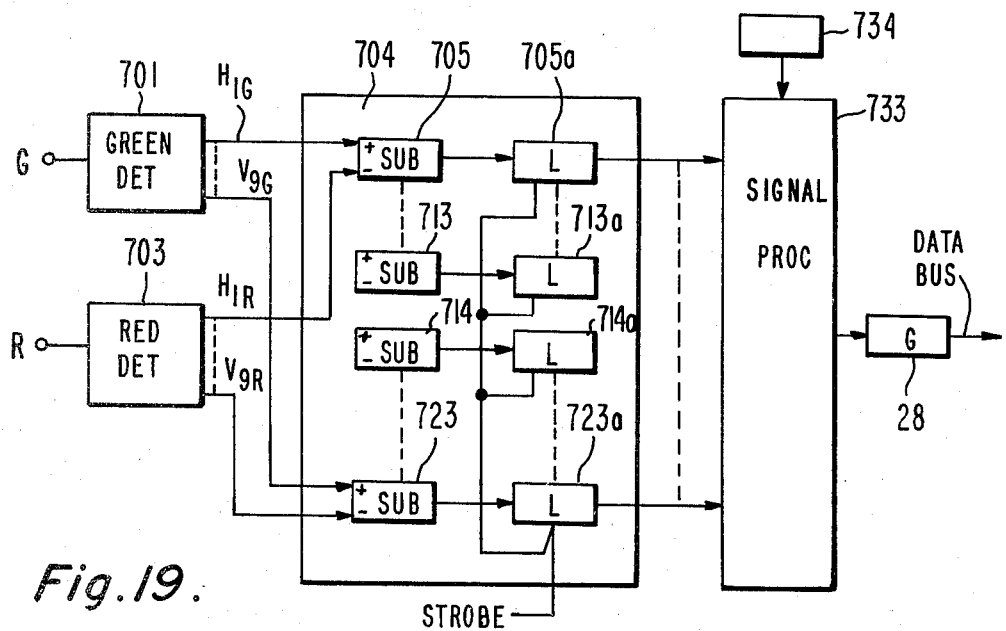
Fig.19.

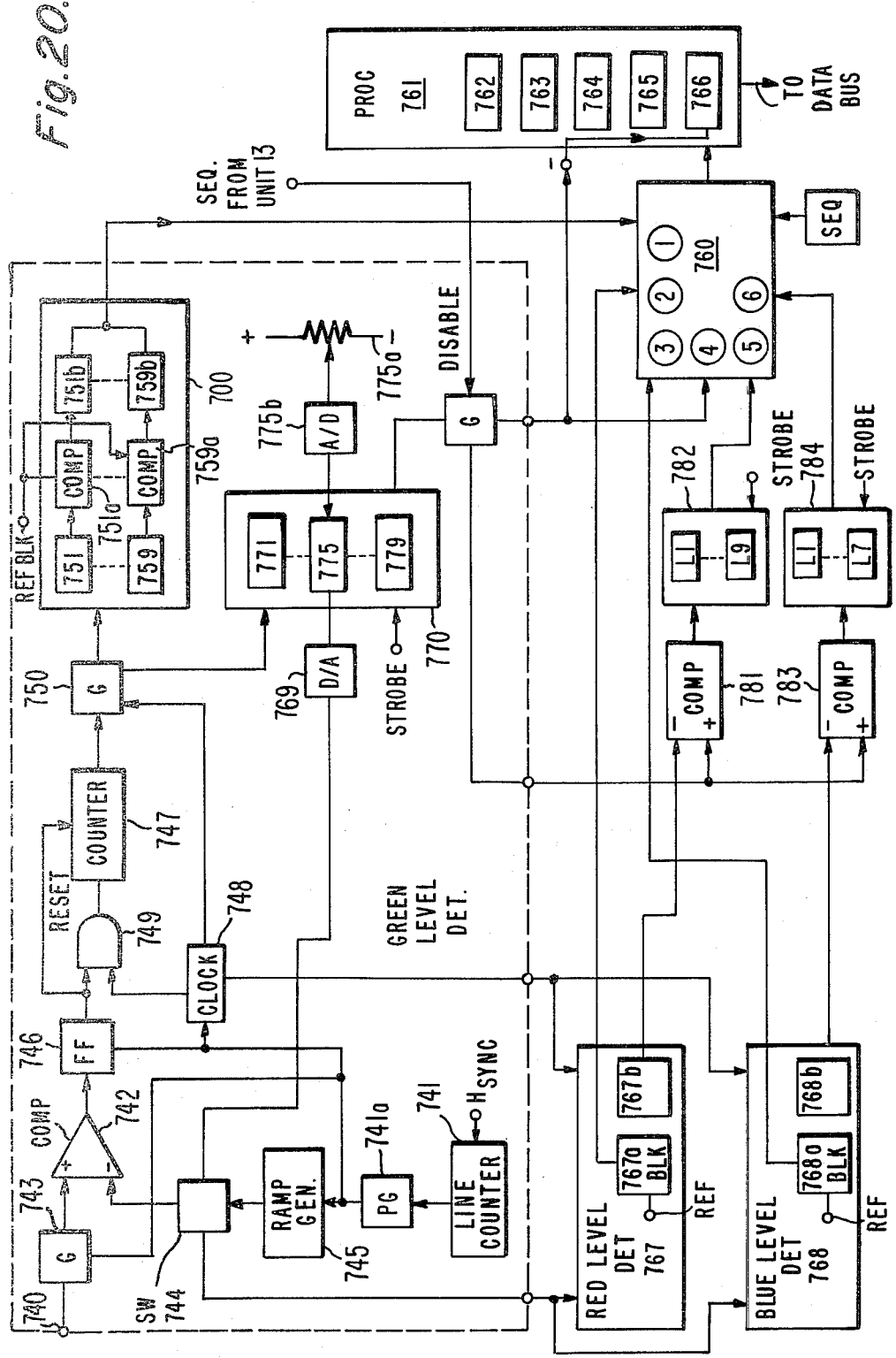

AUTOMATIC SETUP SYSTEM FOR TELEVISION CAMERAS

BACKGROUND OF THE INVENTION

This invention relates to an automatic setup system for television cameras and more particularly automatic setup for color television cameras.

In the present TV color camera systems setup adjustments are located in many different places. Some of the setup adjustments are in the camera head, some located in the base equipment, when used, and some are remoted to the base equipment from the camera head to allow monitoring facilities to make the adjustment. Most of the setup adjustments are usually located in the camera head or when base equipment is used, in the base equipment. The total number of setup adjustments is often 80 or more. There are primary setup functions such as fine registration, coarse registration, geometry, shading, black level, white level, etc. There are within each primary setup function a plurality of secondary setup functions. For example, fine registration can have fourteen setup functions for adjustment of the red camera video to match the green camera video. The fourteen functions are horizontal centering, horizontal size, horizontal linearity, horizontal tilt, horizontal bow, horizontal keystone, horizontal pincushion, vertical centering vertical size, vertical linearity, vertical tilt, vertical bow, vertical keystone, and vertical pincushion. These setup adjustments are usually made via potentiometer controls which are tightly packed together and usually involve concentric controls. This type packing of the controls adds to the size and weight of the base equipment and the camera and further complicates the adjustments. For small cameras it is convenient to move the camera to the monitoring facilities for the purpose of making the adjustments. In the larger cameras, some of the adjustments have to be remoted to the base equipment where the monitoring facilities are available. The remoting of the controls typically includes separate conductors through a cable to each of the potentiometers. This in itself can cause instability. The labor involved in setting up the camera is considerable and therefore it is desirable to find a more suitable means for performing the setup adjustments. Since there are many adjustments to be made during the useful life of eqiupment and these adjustments are time consuming and require judgment by the operator, it is highly desirable to provide a system for making these adjustments automatically.

To accomplish these adjustments automatically requires some means for detecting the errors and for producing error correction signals. The method used to detect the error and the way in which the errors are handled to provide correction signals determines in a large part the performance of the overall system and the time it takes to make adjustments. While some automatic adjustments have been made, these adjustments are accomplished by measuring or detecting the errors for a given one control for one secondary function and controlling this one secondary function. If one were to extend this process to a system for all of the setup controls, this process of measuring the errors and adjusting the control for each secondary function, remeasuring to detect the errors for the next secondary function and correcting the errors, and repeating this for all the secondary controls sequentially would take a considerable length of time. Since the controls interact with each other, there would also be extra time for repeating the remeasuring and correction of errors caused when correcting the other individual secondary controls or functions. It is therefore desirable to provide a more efficient manner of handling a multiplicity of controls.

SUMMARY OF THE INVENTION

Briefly, an improved system for automatic adjustment of a plurality of television camera controls includes means coupled to the camera for determining and storing the signals representing the measured video at several regions of the total raster. The regional signals are then separately and selectively processed without remeasuring according to a plurality of algorithms to produce a corresponding plurality of separate error correction signals for each of said camera controls. These correction signals are coupled to the camera for adjusting the camera.

DESCRIPTION OF THE DRAWINGS

FIG. 2 is a test chart for measuring the errors according to the preferred embodiment of the present invention.

FIG. 3 illustrates the general location of the nine regions on the chart of FIG. 2.

FIG. 5 illustrates the operation of the fine registration detector.

FIG. 7 is a block diagram of the sequencer in FIG. 6.

FIG. 14 illustrates the relation between image and the pickup tube.

FIG. 15 illustrates the image geometry.

FIG. 18 is a block diagram of the signal processor for obtaining horizontal size correction in FIG. 16.

FIG. 19 is a block diagram of the system for providing coarse registration error correction signals for correcting red to match green registration.

FIG. 20 is a block diagram of the system for providing axis shading and level control.

DESCRIPTION OF THE INVENTION

Figure 1:
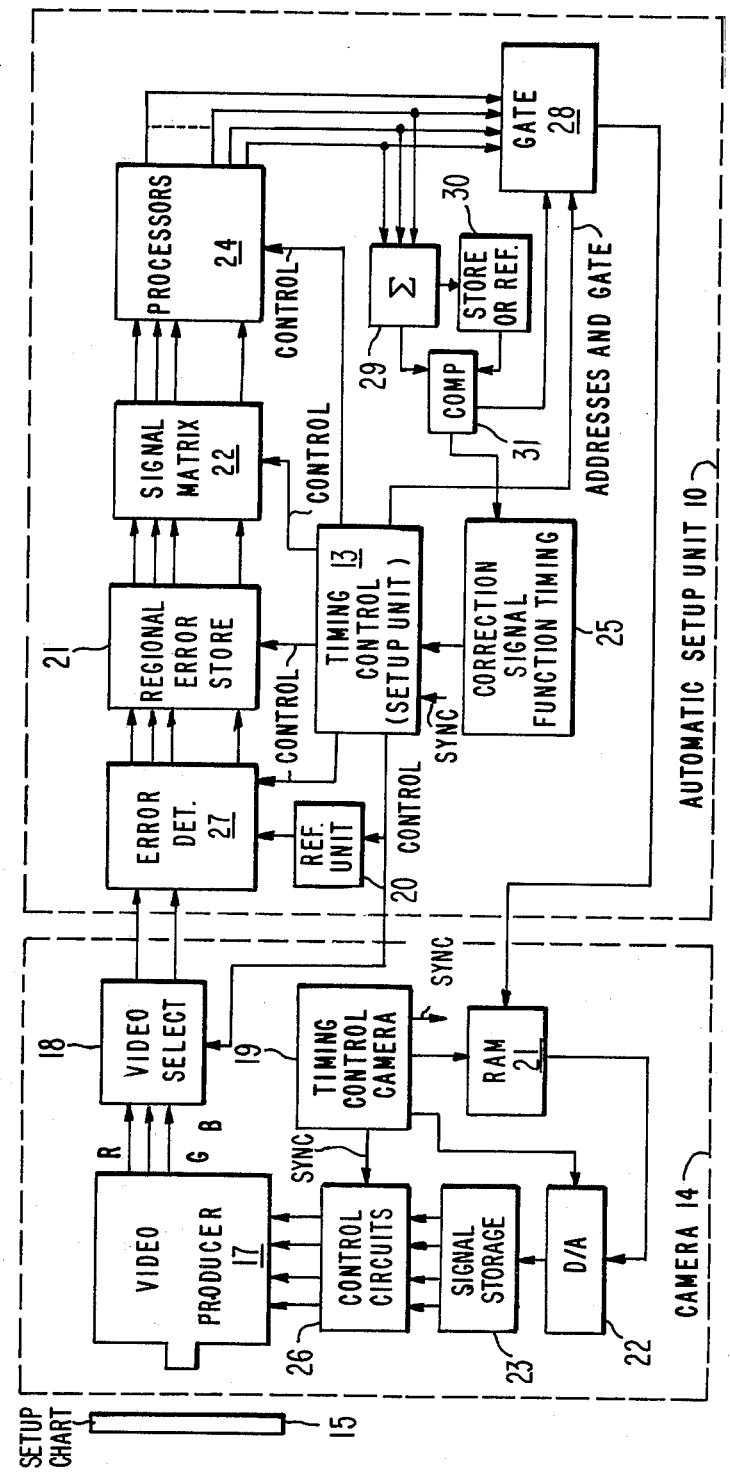
FIG. 1 is an automatic setup system block diagram.

Referring to FIG. 1 there is illustrated a block diagram of the automatic camera setup system. A color television camera 14 includes a video producer 17 which is optically focused on a setup chart 15. The setup chart 15 is positioned in controlled manner relative to the camera 14. The camera video producer 17 includes the three pickup devices (red, green, and blue), deflection devices, and processing circuitry that is responsive to the scanned signals from pickup devices to produce the red, green, and blue video signals. The video producer 17 is controlled by the camera control circuits 26. The produced red, green, and blue video signals are applied to a video selector switch 18 in the camera 14. In the particular camera system described herein a RAM (Random Access Memory) 21 stores the control values in 8-bit binary code format according to predetermined address locations. The camera 14 includes a timing control 19 which includes a horizontal sync generator and circuitry which is responsive to horizontal sync signals (each horizontal line) for sequentially providing addresses to the RAM 21 to cause sequentially an 8-bit binary code signals (associated with the addresses) representing the control value stored in the RAM to be applied to the digital-to-analog (D/A) converter 22. At the digital-to-analog (D/A) converter 22, this 8-bit binary code is converted to a pulse amplitude modulated signal (PAM) representing the binary control value stored in the RAM 21. This analog signal is sequenced to the proper one of a plurality of control signal storage devices in storage unit 23. A timing control signal from the timing control 19 switches the output signal from the D/A converter to the appropriate control storage device in control signal storage unit 23. This may be accomplished by a simple line counter synchronized to horizontal sync which via an address generator provides both the addresses to the RAM and the switching signals from the D to A converter 22. The control signal storage devices may be, for example, storage capacitors which are responsive to the signal from the D/A converter for storing the pulse amplitude modulated signal therefrom. The storage devices are hard wire coupled to the appropriate control circuits 26 for the camera video producer 17.

The automatic setup unit 10 for use with the camera 14 includes a correction signal function timing unit 25 which may include for example a pulser and a ROM where the ROM stores addresses for the camera primary setup functions. The ROM in function timing 25 is responsive to each pulse from the pulser for sequencing primary setup addresses for the primary setup functions of the camera. These addresses are sent to the setup unit timing control 13 for setting up the automatic setup unit 10 for the primary function to be adjusted. For example, the ROM's first address may be the coarse registration address which is sent to the timing control 13 of the setup unit. At the timing control 13 this address is decoded to produce control signals to select the proper video, the appropriate error detector, and via an address generator provide the appropriate addresses for the correction data. When this primary function is completed the pulser in correction signal function timing 25 causes the ROM to step to the next function which may be fine registration correction and this address would be sent to the setup unit timing control 13. When this function is completed, the pulser causes the ROM to provide the next primary function address, etc. The timing control 13 is responsive to a primary setup function for the camera setup to provide a control signal to the video selector 18 in the camera 14 for selecting the appropriate video to be applied from the video selector 18 to an error detector 27. The timing control 13 would also apply whatever reference video might be required from reference unit 20. The error detector 27 in response to the video applied thereto detects the errors on a region by region basis as determined by the chart 15.

If there are C independent controls for fine registration then at least C/2 regions must be examined in order to utilize them all. If exactly C/2 regions are examined, then all the regional errors can be reduced to 0. In practice better overall registration is obtained by examining more regions and then using one or more weighting averaging techniques to obtain an overall estimate of the errors in the various controls. There is no limit to the number of regions that can be examined except those imposed by hardware and software considerations. For the 14 controls for fine registration to be discussed or for fewer controls some reasonable number of regions are 25 regions arranged in 5×5 array, 12 regions in a 4×3 array, and 9 regions in a 3×3 array. In this application the 9 region array is utilized. This number is chosen as a minimum reasonable number of regions when using between ten and fourteen controls which gains the benefit of averaging. Extension to more regions is fairly straight forward but the processing becomes proportionately more complex and associated circuitry becomes more complex.

Referring to FIG. 2, there is illustrated the chart 15 for detecting the horizontal and vertical coarse and fine registration errors, geometry errors and amplitude errors. The chart includes 9 identical chevron marks 12 and 9 horizontal bars or blocks 16. The 9 regions are indicated in FIG. 3. A chevron is a pair of diagonal marks extending at an angle toward each other. The chart position and a setup mark must be accurately located with respect to the television raster. The chevron marks are used in connection with fine registration detection and the horizontal bars are used in connection with coarse registration, geometry, axis shading, and white level detection.

The error detector 27 detects the error signals in each of the 9 regions indicated in FIG. 3 by examining the video signals associated with the marks in the corresponding location of the television raster. The setup unit timing control 13 provides the clock and timing information for making these measurements. The detected error signals from each of the nine regions is applied to a plurality of regional error storage devices in regional error storage unit 21. Since there are 9 regions, there is at least nine error signals and nine error storage devices in error storage unit 21. In the case of the situation where there are two error signals derived for each region there are 18 error storage devices. A control signal from the timing control 13 provides a signal indicative of the horizontal line number and the position of the scan to the error storage unit 21 to gate the detected error signal to the proper storage device. These stored error signals from the nine regions are then utilized to provide the correction data for all of the secondary functions of the primary setup function.

The camera setup unit includes a processor unit 24 which includes a plurality of signal processors. Each of these processors corresponds to a secondary setup function and is designed to process the signals applied thereto according to a different algorithm to produce an error correction signal for a secondary function. The stored error signals in the regional storage devices of unit 21 are in response to a timing signal from timing control 13 simultaneously applied via signal matrix 22 to the appropriate processors in unit 24. The appropriate processors in unit 24 are selected based on the primary function address from function timing 25. The selected signal processors 24 individually process the correction data using the same stored information from the error storage unit 21 to produce the plurality of error correction signals that correspond to the plurality of secondary functions being adjusted.

These secondary error corrections are each applied sequentially via gate 28 with the appropriate gate control signal and address (corresponding to the secondary function data) provided from the timing control 13 to the RAM 21 in the camera during the setup control period as determined from the camera timing control 19. The timing control 19 again applies new video signals to the error detector 27 and these detected error signals region by region are stored in the regional error storage devices of unit 21. These stored error signals are applied to the plurality of processors of unit 24 via matrix 22 for producing the plurality of secondary function correction data and gating to the RAM. The correction data signals from the processors 24 are summed in a summer 29. The command error signals in summer 27 are compared with the previously stored sum of error signals from storage or reference 30 in comparator 31. These compared signals at comparator 31 determine whether or not to stop the primary setup function. If the sum of the errors is not reduced or reaches a predetermined reference error the setup is stopped and the setup procedure is finished and the pulser in the function timing 25 (via a control signal from comparator 31) is incremented and the ROM provides an address for the next primary setup function.

Considering for example, the primary function for fine registration includes the secondary functions of horizontal centering, horizontal size, horizontal linearity, horizontal bow, horizontal tilt, horizontal keystone, horizontal pincushion, vertical centering, vertical size, vertical linearity, vertical bow, vertical tilt, vertical keystone, and vertical pincushion. The fourteen processors for these functions in processor line 24 would be selected from the timing control based on the particular fine registration address from function timing 25. The timing control 13 provides a signal to select the two video signals to be compared such as the green video and the red video to the fine registration error detector in detector 27. The error detector 27 compares the times at which the chevrons appear in the green video and the red video and provides both horizontal and vertical error information. The horizontal and vertical error information of each of the nine regions is stored separately in regional storage unit 21. In this case there would be 18 storage devices in storage unit 21, a horizontal and vertical error storage device for each location. The separately stored horizontal and vertical error signals for each region are applied simultaneously via the signal matrix 22 to the fourteen processors in unit 24 for the fine registration correction mentioned previously. Each of these processors 24 would add, subtract, and multiply selected stored regional error information according to 14 algorithms to be discussed later to provide simultaneously the 14 error correction signals for the fourteen fine registration secondary functions. These correction signals are applied with their appropriate addresses (from the timing control 13) to the RAM 21 wherein they are used to update the stored binary signal in the RAM 21. When the RAM is addressed for updating, the stored data is placed in temporary storage and the correction signal adds to or subtracts from this stored data and the resultant is stored at the appropriate address in the RAM. When the RAM 21 is addressed in the normal scanning cycle (to refresh the storage devices in signal storage 23), the new information stored in the RAM is converted by the digital-to-analog converter 22 and applied to the appropriate control signal storage elements in storage 23 and then applied to the control circuitry 26 as discussed previously. A more detailed description of this operation is described in application, Ser. No. 894,008, filed Apr. 6, 1978, entitled "AUTOMATIC SETUP SYSTEM FOR TELEVISION CAMERAS," of Robert A. Dischert. The timing control 13 includes a horizontal sync generator or is responsive to the horizontal sync from the camera timing control 19. The addresses to the RAM 21 and the D/A converter 22 are timed with respect to the camera horizontal sync. The timing control 13 decodes the primary function address from the correction signal function timing 25 to provide via an address generator and commutator in the timing control the appropriate secondary addresses and gating signal to gate 28. The timing is based for example on the horizontal line count for sequencing the operation of the system.

Figure 4:
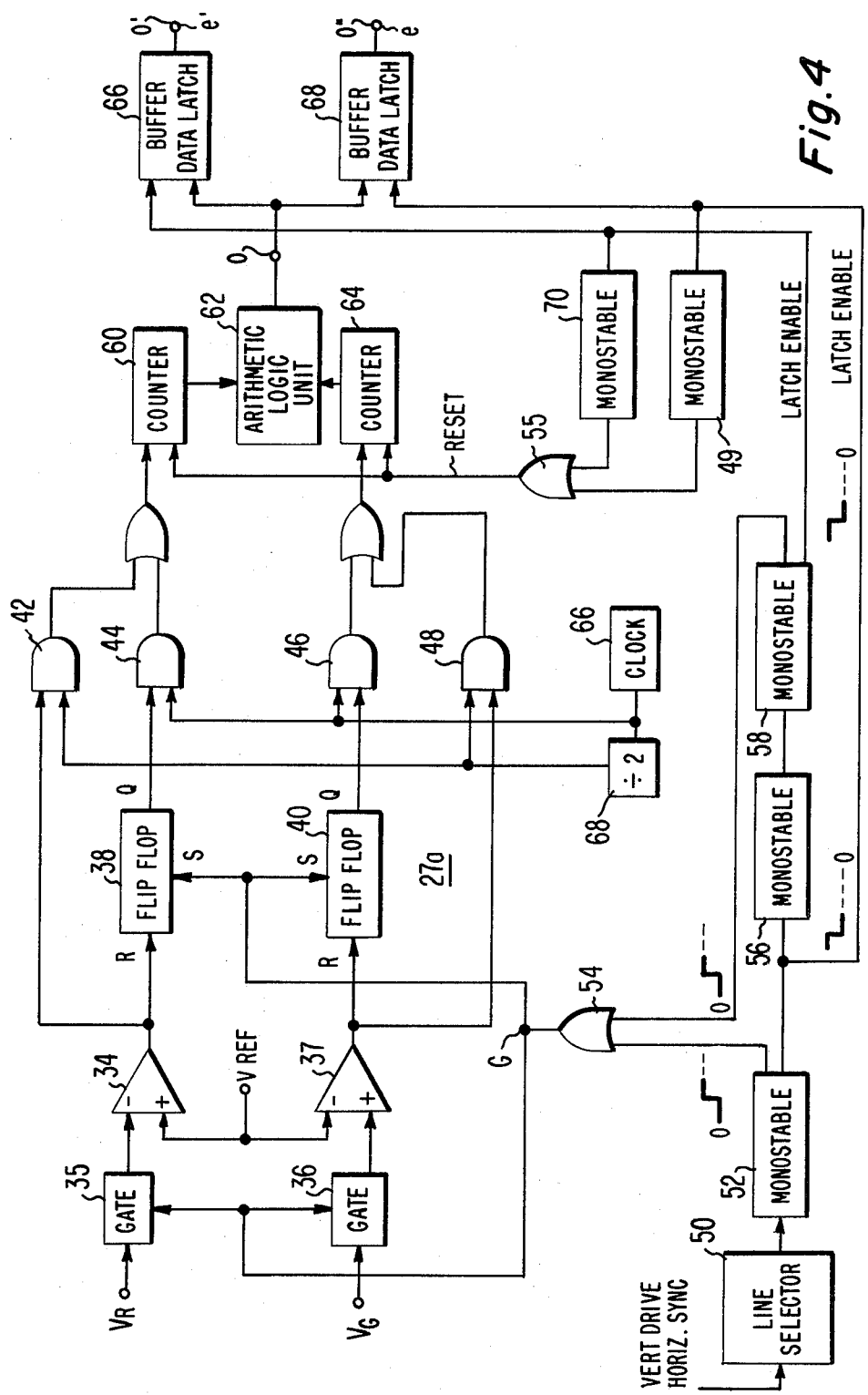
FIG. 4 is a block diagram of the fine registration detector.

Referring to FIG. 4, there is illustrated a block diagram of the fine registration detector 27a in error detector 27. The timing and control 13 decodes the primary setup address signal from function timing 25 and provides an appropriate control signal to switch the proper detector (fine registration) to receive the video output from the video producer 17. The two raster related video signals, for example, $V_R$ (red video) and $V_G$ (green video) are applied respectively to the input terminals of video gates 35 and 36. A line selector 50 which is coupled to the timing control 13 is responsive to the horizontal line number by means of known divider circuit so that for example a control signal may be provided for line 128 of a particular field where the reference mark to be measured is either in regions 4, 5, or 6 of FIG. 3. The output from the line selector 50 is applied to a pulser such as a monostable multivibrator 52 which provides a pulse at the appropriate time period to be measured of the marks in the regions 4, 5, and 6. The output from the monostable 52 is coupled to an OR gate 54 from which the gate signal G is applied to the gates 35 and 36 and to the set inputs of flip-flops 38 and 40. The duration of the monostable 52 is adjusted such that the length of the gating signal corresponds to the mark period R-R intersecting the oblique line patterns illustrated in FIG. 5. For the duration of the gating signal the detector stores the clock counts in the counters 60 and 64. The gated video signal from the videos $V_R$ and $V_G$ are compared to a reference level at comparators 34 and 37. The signals at the output of the comparator 34 and 37 are low until the video signal amplitude increases to a point where they exceed the reference voltage. At this point the output of the comparators 34 and 37 goes high (although, not necessarily at the identical time). The output signals of the comparators are coupled to the respective inputs of flip-flops 38 and 40 and to one input each of the respective gates 42 and 48. The output of flip-flops 38 and 40 is coupled to one input each of respective gates 44 and 46. One input each of gates 46 and 44 is coupled to the output of clock pulse generator 66 operating, for example, at a nominal frequency of 100 MHz. The clock output of clock 66 is coupled to a divide by 2 circuit 68 and which in turn is coupled to one input of gates 42 and 48. The outputs of gates 42 and 44 are in an "OR" configuration to the inputs of counter circuit 60 while the outputs of gates 46 and 48 are coupled in an "OR" configuration to the input of a counter circuit 64. The outputs of counters 60 and 64 are coupled to the respective inputs of the arithmetic logic unit 62 which for example may sum or subtract the number of counts stored in the counters 60 and 64 for developing an output at an output terminal 0 that equals the difference of the total number of counts stored in counters 60 and 64. The counter 60 counts the accumulated clock pulses until the video waveform reaches an amplitude equal to the reference voltage. When the reference $V_R$ is exceeded by $V_R$ (red video) the comparator 34 causes the flip-flop 38 to change state which disables the gate 44 and simultaneously enables gate 42 which couples the $\frac{1}{2}$ clock rate to the input of counter 60 for the time the video exceeds the reference level. In this manner the counter 60 registers the count to the center of the left chevron mark in each region. Similarly, the counter 64 counts to the center of the mark by counting at $\frac{1}{2}$ the rate after the $V_G$ video from gate 36 exceeds the reference level. The difference signal e represented in FIG. 5 is provided out of the arithmetic logic unit 62. The arithmetic logic unit 62 may be, for example, a binary subtractor and the counters being binary digital counters. At the end of the gating signal as determined by the monostable multivibrator 52 the trailing edge transition of monostable multivibrator 52 is coupled to the monostable multivibrator 56, monostable multivibrator 49 and the data latch buffer 68 and serves to recondition the detector portion of FIG. 4 to sample the right side chevron pattern illustrated in FIG. 5 as lines $V_R'$ and $V_G'$ in the following manner. The trailing edge of the output signal from monostable multivibrator 52 is used as a latch enable signal for data latch buffer 68 and the difference signal e in binary form is available at terminal O" for further processing. The output of the monostable multivibrator 52 also sets monostable multivibrator 49 whose output is coupled to OR gate 55 which in turn is coupled to the reset terminals of counters 60 and 64 so that they are cleared for the next measurement. The duration of monostable multivibrator 49 is adjusted to provide a sufficient delay to insure that the arithmetic logic unit and data latch buffer 68 have completed their operation before the counters are reset. As previoussly stated the output signal of monostable multivibrator 52 is also coupled to monostable multivibrator 56, the duration of which is adjusted to provide a delay in re-establishing the gating signal for making the measurement on the right side of the reference pattern shown by lines $V_R'$ and $V_G'$ in FIG. 5. As in making the left side measurement, the monostable multivibrator 58, which is triggered by the output of monostable multivibrator 56 generates a leading edge signal which is coupled to OR gate 54 at the conclusion of the measurement of the right side of the reference pattern. Monostable multivibrator 58 provides a latch enabled signal, which transfers the right pattern side measurement to data latch buffer 66 where the count representing the digital quantity e' of FIG. 5 is made available at terminal O' and resets the counters 60 and 64 by means of the monostable multivibrator 70 and OR gate 55. Subsequent processing to be discussed later in connection with FIG. 6 takes the signals e and e' at terminals O" and O' and by summing the e and e' signals and dividing by 2 to derive the horizontal displacement error and by subtracting the signals e and e' and dividing by 2 the vertical displacement error is derived. A more detailed description of the fine registration detector is discussed in U.S. Pat. No. 4,133,003 of Robert E. Flory et al, entitled, "RASTER REGISTRATION SYSTEM FOR A TELEVISION CAMERA".

Figure 6:
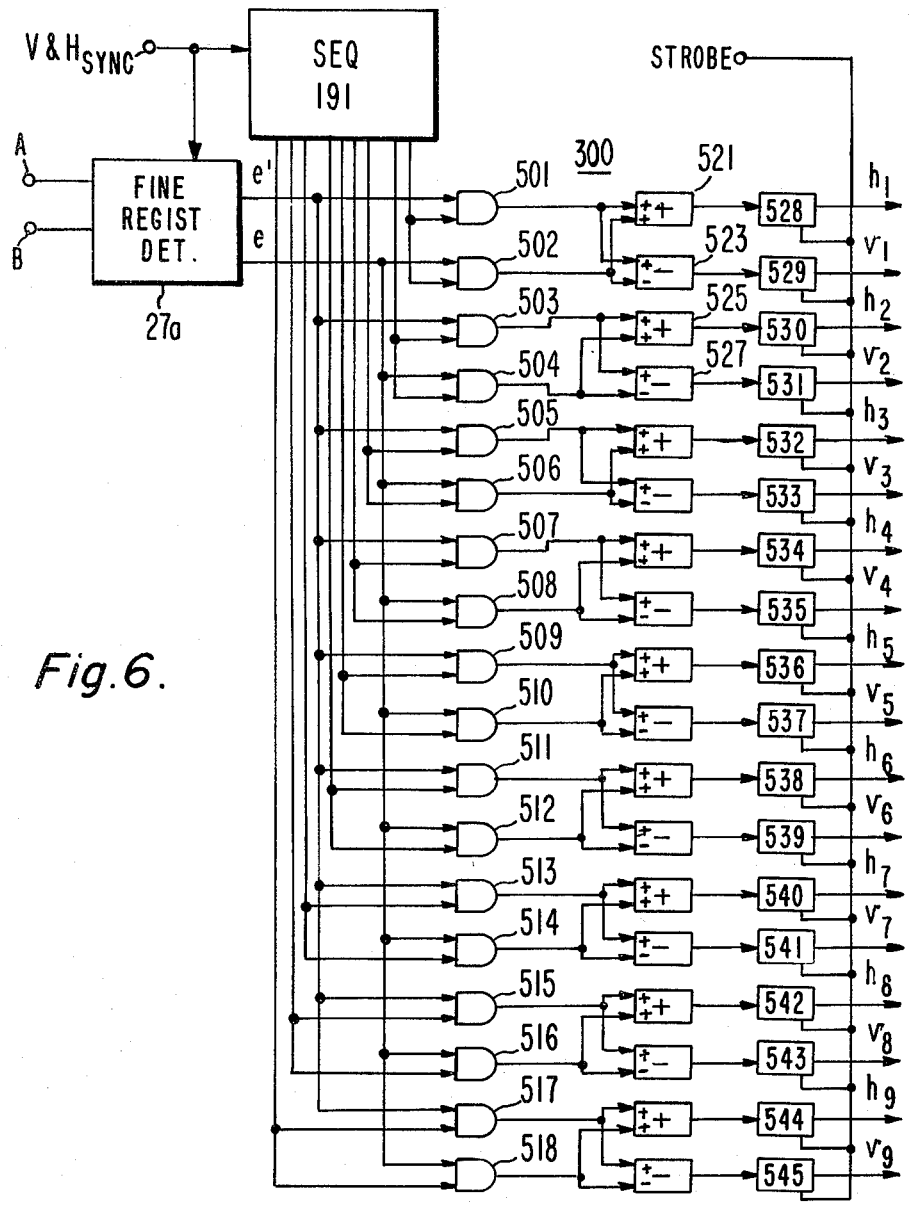
FIG. 6 is a block diagram of the converter system for adding and subtracting the signals from the fine registration detector.

Referring to FIG. 6, there is a block diagram illustrating the manner in which the individual horizontal and vertical error signals for fine registration are provided for each of the nine regions and stored. The fine registration detector 27a provides the e' and e error signals as discussed previously and as described in the above cited application of Flory et al. These e and e' signals when summed and subtracted, as discussed above, produce the horizontal and vertical fine registration errors in each region. The e' signal is applied to AND gates 501, 503, 505, 507, 509, 511, 513, 515, and 517. The e signal is coupled to the input of AND gates 502, 504, 506, 508, 510, 512, 514, 516, and 518. The horizontal and vertical raster information from the timing and control 13 is applied to the sequencer 191 and enables the appropriate AND gates 501 through 518 in pairs corresponding to the position of the raster such that for example when the camera is scanning in the middle of region 1 and viewing the pair of chevron marks 12a and 12b in region 1 (see FIGS. 2 and 3), the output from the registration detector is then coupled to AND gates 501 and 502. The e' and e signals at AND gates 501 and 502 are enabled from the sequencer 191 are summed in binary adder 521 and subtracted in binary subtractor 523. The signals from the counters 60 and 64 in the fine registration detector are binary signals such as an 8-bit code. Therefore, the signals are summed in binary adders and subtractors to produce 8-bit binary signals. The binary signals from adder 521 are then stored in latch 528 and the difference binary signals from subtractor 523 are stored in the latch 529. These latches correspond to regional error storage devices in unit 21 of FIG. 1. The summed signals at latch 528 provides the horizontal error signal for region 1 and the subtracted signal at latch 529 provides the vertical error signal for region 1. These horizontal and vertical errors in region 1 are represented herein by $h_1$ and $v_1$. Similarly, the horizontal and vertical errors are detected by sequencing e' and e signals via AND gates 503 and 504 from ssequencer 191 to binary adder 525 and binary subtractor 527 to provide horizontal and vertical error signals $h_2$ and $v_2$ at latches 530 and 531 for region 2. Similarly, the gates 505 and 506, 507 and 508, 509 and 510, 511 and 512, 513 and 514, 515 and 516, 517 and 518 are sequenced to their respective binary adders and binary subtractors to provide the horizontal and vertical error signals $h_3$ through $h_9$ and $v_3$ through $v_9$ at latches 532 through 545 for regions 3 through 9. Referring to FIG. 7, there is illustrated a block diagram of a sequencer usable in FIG. 6. The sequencer 191 includes an oscillator 601 synchronized to the horizontal and vertical sync signal from timing control 13 for example. The oscillator 601 output is applied to a line counter 607. A pulse generator 603 is responsive to the particular line count for the vertical center of regions 1, 4, and 7 for generating three equally spaced pulses coinciding with the selected time periods of the chevrons in that horizontal line. For example, for the regions 1, 2, and 3 the horizontal line may be line 85, for regions 4, 5, and 6 the line may be line 128 for regions 7, 8, and 9 the line number may be line 171. The output signals from pulse generator 603 is provided to a stepper gate 609 which in response to each pulse from generator 603 provides an enable voltage to next one of the pair of AND gates 501 through 518.

Figure 8:
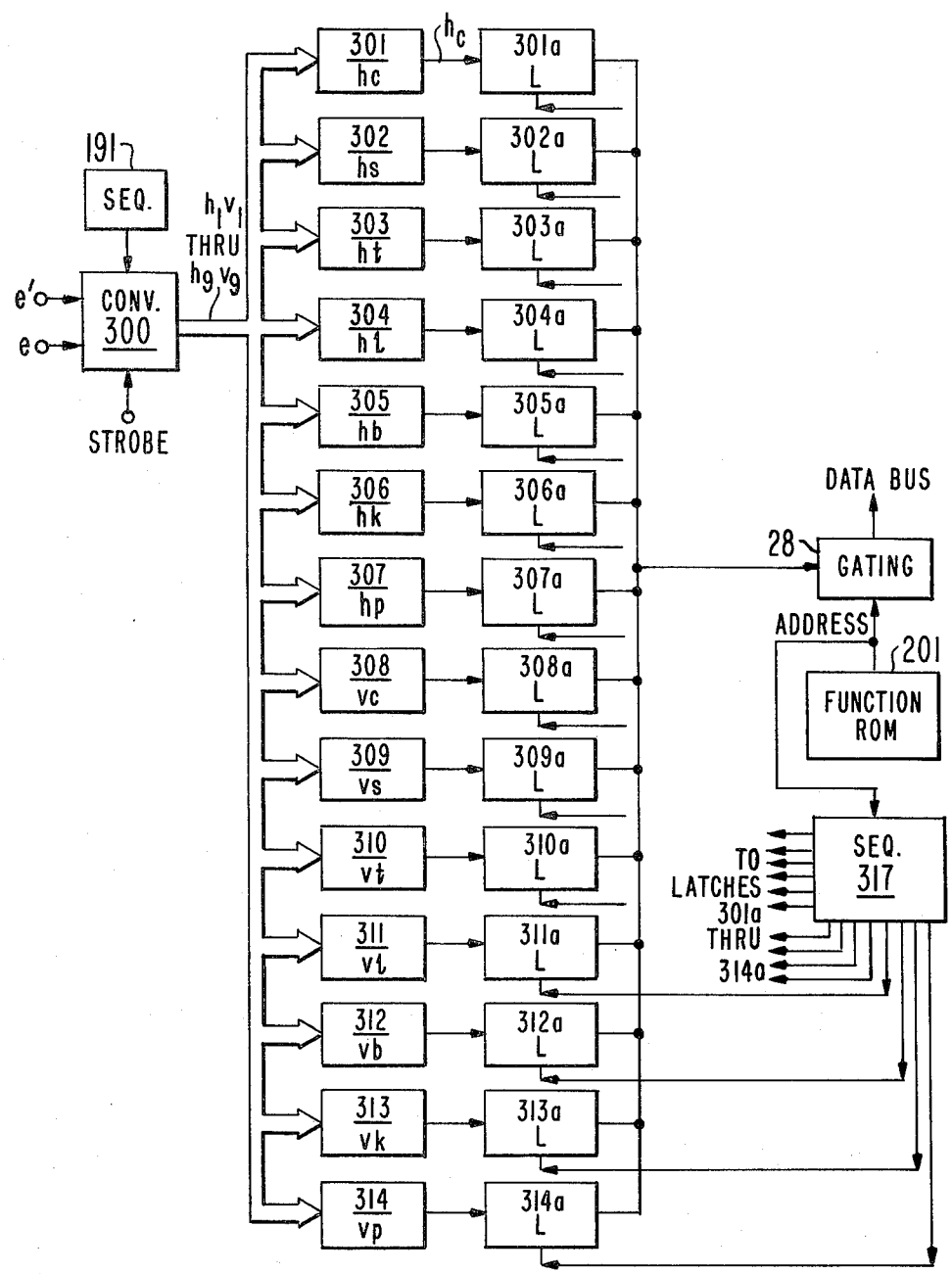
FIG. 8 is a block diagram of the signal processor unit.

Referring to FIG. 8, the nine horizontal error signals ($h_1$ through $h_9$) and the nine vertical error signals from latches 528 through 545 are simultaneously applied to the fourteen signal processors 301 through 314 in response to a strobe signal (indicating the end of a field for example) from the timing control. Each signal processor 301 through 314 provides an error correction signal for a different secondary setup function according to a separate algorithm. The processors 301 through 314 are designed to selectively process the data based on error measurement of the nine regions illustrated in FIG. 3 and to give weighting factors to certain regions for certain applications. For the 14 error correction signals to be derived from the signal processors 301 through 314, the following algorithms have been derived with associated weighting factors:

$$E_{hc} = K_{hc} h_5 \quad (1)$$

$$E_{hs} = K_{hs}(-h_1 + h_3 - 4h_4 + 4h_6 - h_7 + h_9) \quad (2)$$

$$E_{ht} = K_{ht}(h_1 + 4h_2 + h_3 - h_7 - 4h_8 - h_9) \quad (3)$$

$$E_{hl} = K_{hl}(-h_1 + 2h_2 - h_3 - 6h_4 + 12h_5 - 6h_6 - h_7 + 2h_8 - h_9) \quad (4)$$

$$E_{hb} = K_{hb}(-h_1 - 6h_2 - h_3 + 2h_4 + 12h_5 + 2h_6 - h_7 - 6h_8 - h_9) \quad (5)$$

$$E_{hk} = K_{hk}(-h_1 + h_3 + h_7 - h_9) \quad (6)$$

$$E_{hp} = K_{hp}(-h_1 + h_3 + 2h_4 - 2h_6 - h_7 + h_9) \quad (7)$$

$$E_{vc} = K_{vc}(-v_5) \quad (8)$$

$$E_{vs} = K_{vs}(-v_1 - 4v_2 - v_3 + v_7 + 4v_8 + v_9) \quad (9)$$

$$E_{vt} = K_{vt}(-v_1 + v_3 - 4v_4 + 4v_6 - v_7 + v_9) \quad (10)$$

$$E_{vl} = K_{vl}(v_1 + 6v_2 + v_3 - 2v_4 - 12v_5 - 2v_6 + v_7 + 6v_8 + v_9) \quad (11)$$

$$E_{vb} = K_{vb}(v_1 - 2v_2 + v_3 + 6v_4 - 12v_5 + 6v_6 + v_7 - 2v_8 + v_9) \quad (12)$$

$$E_{vk} = K_{vk}(-v_1 + v_3 - v_7 + v_9) \quad (13)$$

$$E_{vp} = K_{vp}(-v_1 + 2v_2 - v_3 + v_9 - 2v_8 + v_9) \quad (14)$$

Figure 9:
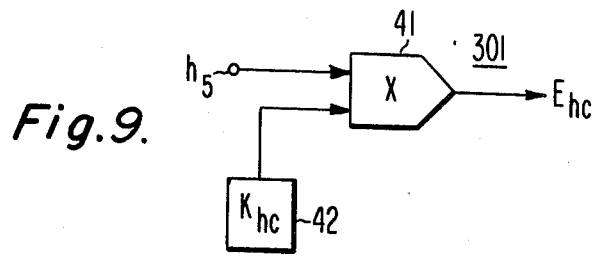
FIG. 9 is a block diagram of the signal processor in FIG. 8 for obtaining horizontal centering correction.

The terms $h_1$ through $h_9$ represent the horizontal error signals and the terms $v_1$ through $v_9$ represents the vertical error signals. The subscripts indicate the regions. The numbers, 2, 4, 6, and 12 represent the weighted values given to selected regions. The signal $E_{hc}$ represents the horizontal centering correction from processor 301. Signal $E_{hs}$ represent the horizontal size correction from processor 302, the signal $E_{ht}$ represents the horizontal tilt correction from processor 303, the signal $E_{hl}$ represents the horizontal linerity correction from processor 304, the signal $E_{hl}$ represents the horizontal bow correction from processor 305, signal $E_{hk}$ represents the horizontal keystone correction from processor 306, and the signal $E_{hp}$ represents the horizontal pincushion correction from processor 307. The signal $E_{vc}$ represents the vertical centering correction from processor 308, the signal $E_{vs}$ represents the vertical size correction signal from processor 309, the signal $E_{vt}$ represents the vertical tilt correction from processor 310, the signal $E_{vl}$ represents the vertical linearity correction from processor 311, the signal $E_{vb}$ represents the vertical bow correction from processor 312, the signal $E_{vk}$ represents the vertical keystone correction from processor 313, and the signal $E_{vp}$ represents the vertical pincushion correction from processor 314. The processor 301 for horizontal centering is indicated by equation $E_{hc} = K_{hc} \times h_5$. The horizontal centering correction signal ($E_{hc}$) is derived in the processor by multiplying the horizontal error signal from the center region 5 (from latch 536 in FIG. 6) by $K_{hc}$. This multiplier ($K_{hc}$) or weighting constant takes into consideration the sensitivity of the deflection circuitry and the gain of the control circuitry of the camera such that the output signal $E_{hc}$ is of the correct size and polarity to minimize the horizontal centering error when applied to the camera. Note that in this processor horizontal centering is defined by region 5 only. It would be possible to include contributions from other regions using an equation such as $E_{hc} = K_{hc}(h_2 + h_4 + h_5 + h_6 + h_8)$. Since the signals at the latches 525 through 545 are 8-bit binary signals, the 8-bit binary word $h_5$ is multiplied as shown in FIG. 9 in a binary multiplier 41 by a binary number representing $K_{hc}$.

Multiplying two digital (binary numbers) such as done in device 41, can be performed sequentially or combinationally using cascade logic networks. The sequential technique is well-known and described in literature (see, for examples, *Digital Computer and Control Engineering*, R. S. Ledley, McGraw Hill Book Company, Inc. 1960, Chapters 15 and 16; and the *Logic of Computer Arithmetic:* I. Flores, Prentice-Hall, Inc., 1963, Chapters 3, 8 through 11). The use of combinational networks is also well-known and though usually requiring more hardware, produces desired results after the propagation delays of the network gates (see for example, *Multiplying Made Easy For Digital Assemblies* by C. Ghest, *Electronics*, Nov. 22, 1971, pages 56–61, and *Parallel Multiplier Gets Boost from IC Iterative Logic*, by J. Springer and P. Alfke, *Electronics*, Oct. 12, 1970, pages 89 to 93).

Figure 10:
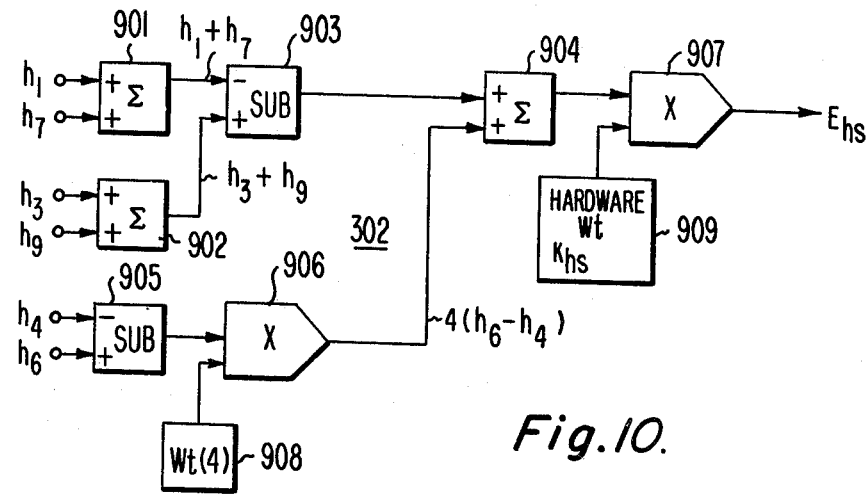
FIG. 10 is a block diagram of the signal processor in FIG. 8 for obtaining horizontal size correction.

Referring to FIG. 10 and considering equation 2, there is illustrated the manner in which the signal processor 302 produces the horizontal size error correction signal. The horizontal error 8-bit binary ssignals from latches 525 and 540 (correspond to regions 1 and 7) are binary added in binary summer 901. Similarly, the horizontal error signals associated with regions 3 and 9 from latch 532 and 544 are summed in binary adder 902. The summed signals from binary summer 901 and 902 are subtracted in binary subtractor 903 to provide a difference signal to binary summer 904. Binary addition and subtractor devices are well-known in the stated art and there is not considered to be a need for their explanation. The binary horizontal error signals associated wtih regions 4 and 6 (represented by $h_4$ and $h_6$) are applied to the negative and positive terminals respectively of a binary subtractor 905. The binary difference signal in subtractor 905 is applied to a binary multiplier 906. the multiplicand of $h_6$-$h_4$ is multiplied by a weighted value of 4 for example from source 908 in binary multiplier 906. The resultant binary multiplied signal is applied to the other input of binary summer 904. The binary summed signal at the output of the binary summer 904 is applied to the binary multiplier 907. A signal level which represents the hardware weighting factor $K_{hs}$ is provided from source 909 to the other input terminal of binary multiplier 907. Note that the value of the numbers stored in 908 can be changed to emphasize different methods of weighting the image by placing more or less emphasis on the center with respect to the corners.

Note that the value of 909 is adjusted so that the output signal $E_{hs}$ is of the proper polarity and magnitude to minimize the error.

Figure 11:
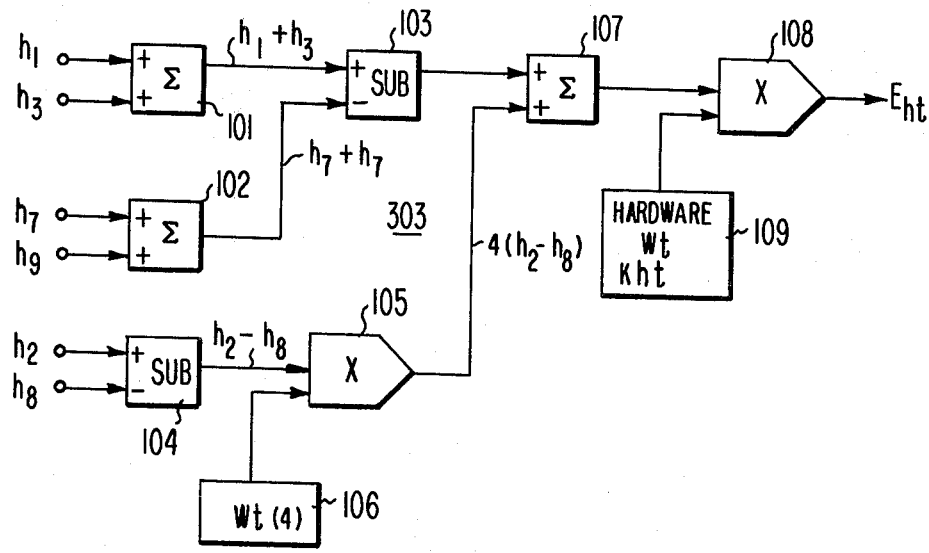
FIG. 11 is a block diagram of the signal processor in FIG. 8 for obtaining horizontal tilt correction.

Referring to FIG. 11 there is illustrated the signal processor 303 for deriving the horizontal tilt error correction signal. The horizontal error signals $h_1$ and $h_3$ associated with the corner regions 1 and 3 are binary added in summer 101 and the horizontal error signals $h_7$ and $h_9$ associated with regions 7 and 9 are binary added in summer 102. These summed signals from binary adders 101 and 102 are subtracted at binary subractor 103 and applied to binary summer 107. The horizontal error signals corresponding to regions 2 and 8 ($h_2$ and $h_8$) are binary subtracted in subtractor 104 and applied to binary multiplier 105. The multiplier for the binary multiplier 105 is provided by a weighting source 106 which provides in binary terms a multiplier of 4. The binary difference signals from binary subtractor 103 are summed in the binary adder 107 with the multiplied signals from multiplier 105. The binary summed signals from binary adder 107 are applied to a multiplier 108. A multiplier value represented by $K_{ht}$ is provided by a source 109 which provides an output signal $E_{ht}$ of the proper polarity and magnitude to minimize the error. The multiplier $K_{ht}$ corrects for the control loop weighting considerations for horizontal tilt correction. It is noted that regions 4, 5, and 6 do not contribute to the tilt correction. It is also to be noted that the center is given a weighted value of 4 times that from the corner regions.

Figure 12:
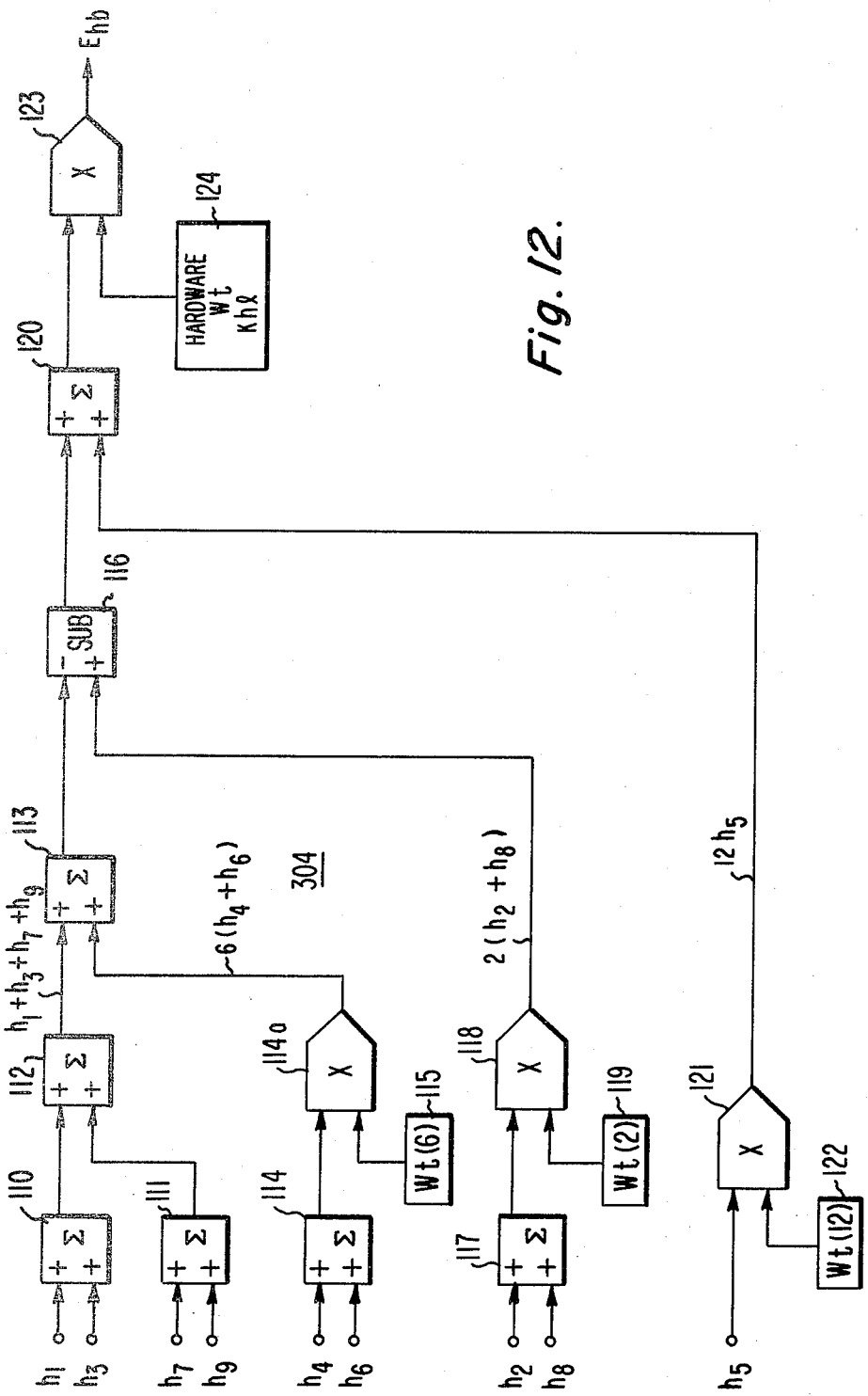
FIG. 12 is a block diagram of the signal processor in FIG. 8 for obtaining horizontal linearity correction.

Referring to FIG. 12, there is illustrated the signal processor 304 for providing the horizontal linearity error correction signal. It is noted viewing FIG. 11 the horizontal error signals associated with regions 1, 3, 7, and 9 are summed in binary summers 110, 111, and 112. The horizontal error signals associated with regions 4 and 6 ($h_4$ and $h_6$) are additively summed in binary adder 114 and applied to binary multiplier 114a. A multiplier of 6 from weighted value source 115 is applied to the binary multiplier 114. The multiplied binary signals from multiplier 114 is additively summed in binary adder 113 to the summed corner signals from binary adder 112. The horizontal error signals associated with regions 2 and 8 ($h_2$ and $h_8$) are additivelly summed in binary adder 117 and multiplied in multiplier 118. A source 119 provides a binary 2 multiplier to binary device 118 and the multiplied binary signals associated with regions 2 and 8 are applied to the plus terminal of binary subtractor 116. The binary summed signals at binary adder 113 are applied to the minus terminal of binary subtractor 116. The binary difference signal from subtractor 116 is applied to the binary adder 120. The horizontal error signals associated with the center regions ($h_5$) is multiplied by a weighted value of 12 from source 112 at multiplier 121 and applied to the binary adder 120. The summed signal at binary adder 120 is multiplied by the weighting factor of $K_{h1}$ from source 124 at multiplier 123. The weighting factor $K_{h1}$ provides a multiplier of the proper magnitude and polarity to minimize the linearity error.

Figure 13:
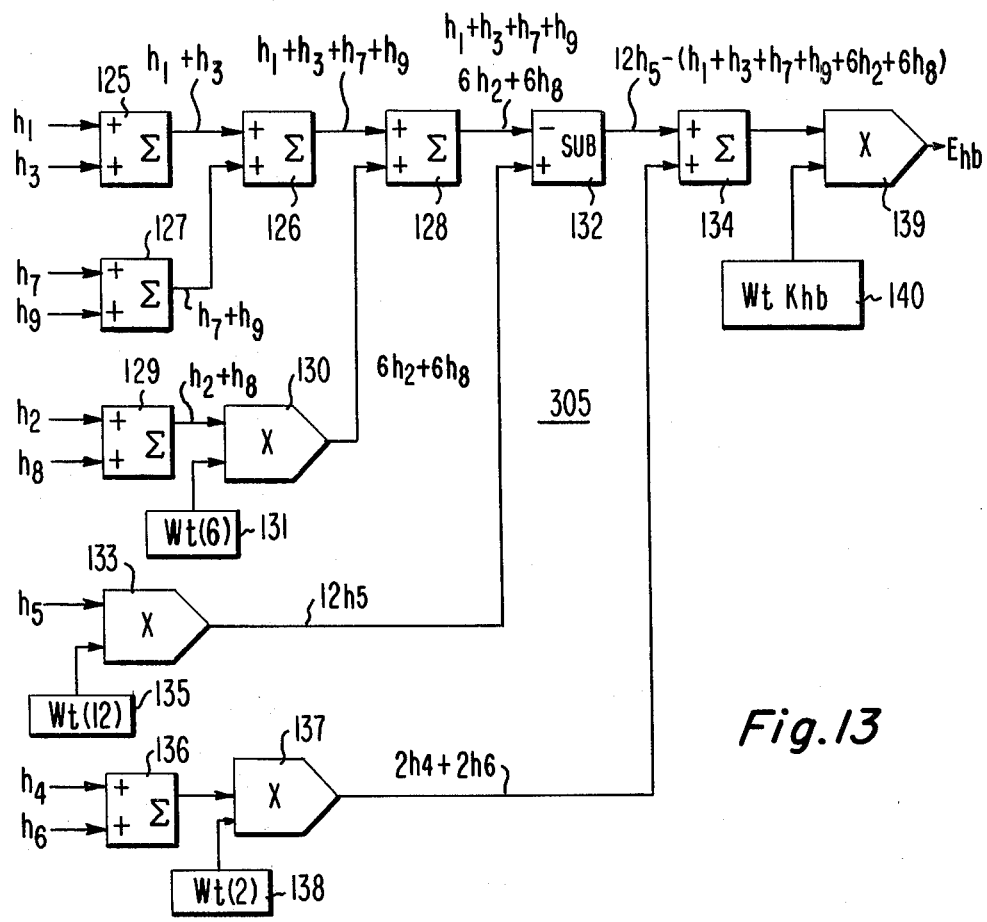
FIG. 13 is a block diagram of the signal processor in FIG. 8 for obtaining horizontal bow correction.

Referring to FIG. 13, there is illustrated a signal processor 305 for deriving horizontal bow error correction signals which corresponds to equation 5. The horizontal error signals measured at regions 1, 3, 7, and 9 are summed in binary summers 125, 126, and 127 and applied to binary summer 128. Horizontal error signals from regions 2 and 8 are summed in binary summer 129 and multiplied by a weighting factor of 6 in binary multiplier 130. The weighting factor of 6 is supplied by a weighting source 131. The multiplied signal from multiplier 130 is applied to binary summer 128 to be summed with the error signals from the corner regions. The horizontal error in the center region is multiplied by a weighting factor of 12 from source 35 at multiplier 133 and applied to the positive input terminal of a binary subtractor 132. The error signals associated with the corner regions and regions 2 and 8 are subtracted from this center region signal in binary subtractor 132 and a resultant is applied to binary summer 134. The horizontal error signals in regions 4 and 6 are summed in binary adder 136 and these summed binary signals are multiplied by a weighting factor of 2 from source 138 at multiplier 137. The multiplied binary signals from multiplier 137 is applied to the other summed input termina input of summer 134. The binary summed signals at summer 134 are multiplied by weighting factor $K_{hb}$ at multiplier 139. The multiplier $K_{hb}$ represents the weighting factor as previously discussed to minimize the horizontal bow error.

By a process similar to that described above, the signal processor 306 for horizontal keystone provides an error correction signal by summing the error signals $h_1$ and $h_9$ and subtracting that sum from the sum of error signals $h_3$ and $h_7$. This difference signal is multiplied by an appropriate weighting factor of $K_{hk}$. The signal processor for pincushion correction is similar to that described above wherein the horizontal error signals $h_1$ and $h_7$ are summed and subtracted from the sum of the error signals $h_3$ and $h_9$. The horizontal error signals $h_4$ and $h_6$ are subtracted in a binary subtractor and multiplied by a weighting factor of 2. These multiplied signals, $2(h_4-h_6)$, are summed with the difference signals $h_3+h_9-h_7+h_1$. These summed signals are multiplied by constant multiplier $K_{hp}$ which provides the output signal with the proper polarity and magnitude to provide for the horizontal pincushion correction. The signal processors 309 through 314 for producing the vertical error correction signals are similar to that discussed above in connection with the horizontal error correction. In the case of vertical correction, the system is responsive to the vertical error signals and follow the equations 8 through 14 in a manner similar to that discussed above in connection with the horizontal correction signals.

Once the error correction signals have been calculated in the processors 301 through 304 then the controls themselves can be adjusted. If the relationship between the error and magnitude of the control adjustment is known which is represented by a weighting factor multiplier K in the signal processors, then the errors for all of the secondary setup functions for fine registration can be corrected in essentially a one step operation. After adjustments have been made the camera should be given time to settle so the errors can be remeasured and calculated. If the errors are below a selected threshold, then the process can be terminated. If the residual errors are too great the adjustment process is repeated.

Referring to FIG. 8, the horizontal and vertical correction signals from a processor 301 through 314 are stored in corresponding latches 301a through 314a and await gating with the appropriate address to the RAM 21 as illustrated in FIG. 1. The gating signal comes from the setup unit timing control 13 which may include a function ROM which is represented in part by a ROM 201 in FIG. 8, for providing the appropriate addresses and a control signal to sequencer 317 to gate the appropriate latch 310a through 314a that corresponds to the function address generated by the ROM 201. In this manner both the address and the correction data are sent together via the gating circuits 28 via the data bus 11 to the RAM 21 in the camera 14 for all fourteen controls.

Referring to the setup charge in FIG. 2, there are horizontal bars or blocks 16 above or below the chevrons 12 discussed previously. These blocks 16 in FIG. 2 are represented in FIG. 2 by black areas in the same manner as the chevrons. Both the chevrons and the blocks may be white areas in a background which may be a gray background. Note that the blocks in the top row of chevrons are above the chevrons and that the blocks in the bottom row regions 7, 8, and 9 are below the chevrons. Notice also that the bars or blocks 16 are both above and below the chevrons in the middle row of regions 4, 5, and 6. The information from the bars above and below the middle row of chevrons (16' and 16") may be summed and divided by 2 to obtain an estimated value for the center of the regions. These horizontal blocks or bars 16 can be used to setup the camera for the primary set of functions of geometry, coarse registration and level.

In setting up the camera (prior to registration) the image size and centering are adjusted manually for example until the image is contained within the active or desired area of the pickup tube. See FIG. 14. Thereafter all adjustments should be made to keep the corners of the image aligned with the circle defining the active area of the pickup tube.

Let the corners of the image A, B, C, and D be centered on the pickup tube as illustrated in FIG. 15. The aspect ratio AB/AD is defined to be the standard NTSC value of 4/3 for the adjusted image. Let the geometry corner horizontal for markers be E, F, I, and H with an aspect ratio $EF/EH = R$ on the test chart. The corner markers E, F, H, and I correspond to the block mark 16 in the regions 1, 3, 7, and 9 respectively. If the measured aspect ratio EF/EH is not exactly R then the horizontal and vertical sizes must be adjusted. It is desirable to move the corners parallel to the edge of the tube to maintain utilization of the tube. For example, point A should move approximately along the line AK in FIG. 15. This happens if $\frac{3}{4}$ AD+AB=constant Let EH=k AD then EF=k AB 3R/4 and $\frac{3}{4}$k EH+4/3Rk EF=constant

∴ 9R/16 EH+EF=constant

As will be discussed later, the horizontal position of a point n which, for example, is located in the middle of a block 16 in FIG. 2 is represented by $H_n$. $H_n$ is equal to the number of counts of a master clock from the edge of the chart to the middle of the block. The vertical position at point n is represented by $V_n$ which is the raster line number. If a shift of r counts in the horizontal position gives the same physical displacement as a one line shift in the vertical direction then the previous equations become:

$9Rr/16 (V_I - V_F) + (H_F - H_E) =$ constant  E. (15)

where $V_I$, $V_F$, $H_E$, and $H_F$ is the position number of points, I, F, and The aspect ratio must be maintained at R:

$$EF/EH = R \quad (16)$$
$$R(EH) - (EF) = 0$$
$$Rr(V_I - V_F) - (H_F - H_E) = \text{constant}$$

The two independent equations 15 and 16 form the basis of adjusting the image to achieve the correct aspect ratio while maintaining it on the active area of the pickup tube.

Before any adjustments are made to the image, the positions of the four corner points must be measured and stored so that the corners can be made to track the edge of the pickup tube as the controls are adjusted.

The initial positions of the four corner points are represented as $H'_n$ which is the initial measured horizontal position in corner region n and $V'_n$ the initial vertical position in corner region n. The equations 1 through 14 used to determine the control errors in fine registration can still be used if $H_n$ (the position of the mark is determined by a master clock) is substituted for $H_n$, and $V_n$ (line count) for $V_n$, except for the four control errors of horizontal and vertical centering and horizontal and vertical size. The equation for calculating these are as as follows:

Horizontal centering error $$E_{hc} = H_1 - H'_1 + H_3 - H'_3 + H_7 - H'_7 + H_9 - H'_9 \quad (17)$$

Horizontal size error $$E_{hs} = 9/16\ Rr(-V_1 + V_1' - V_3 + V_3' + V_7 - V_7' + V_9 - V_9') - H_1 + H_1' + H_3 - H_3' - H_7 + H_7' + H_9 - H_9' \quad (18)$$

Vertical centering error $$E_{vc} = -V_1 + V'_1 - V_3 + V'_3 - V_7 + V'_7 - V_9 + V'_9 \quad (19)$$

Vertical size error $$E_{vs} + Rr(-V_1 + V_1' - V_3 + V_3' + V_7 - V_7' + V_9 - V_9') + H_1 - H_1' - H_3 + H_3' + H_7 - H_7' - H_9 + H_9' \quad (20)$$

Note that the horizontal size error is a measure of the error in the overall size of the image, and that the vertical size error is a measure of the departure from the desired 4/3 aspect ratio. This choice is arbitrary and could just as easily have been made the other way with horizontal size error representing aspect ratio error, and vertical size error representing overall size error. Alternatively both the horizontal and vertical size errors could be made to depend on both size and aspect ratio errors.

The methods of adjusting the controls are similar to those for fine registration.

Figure 16:
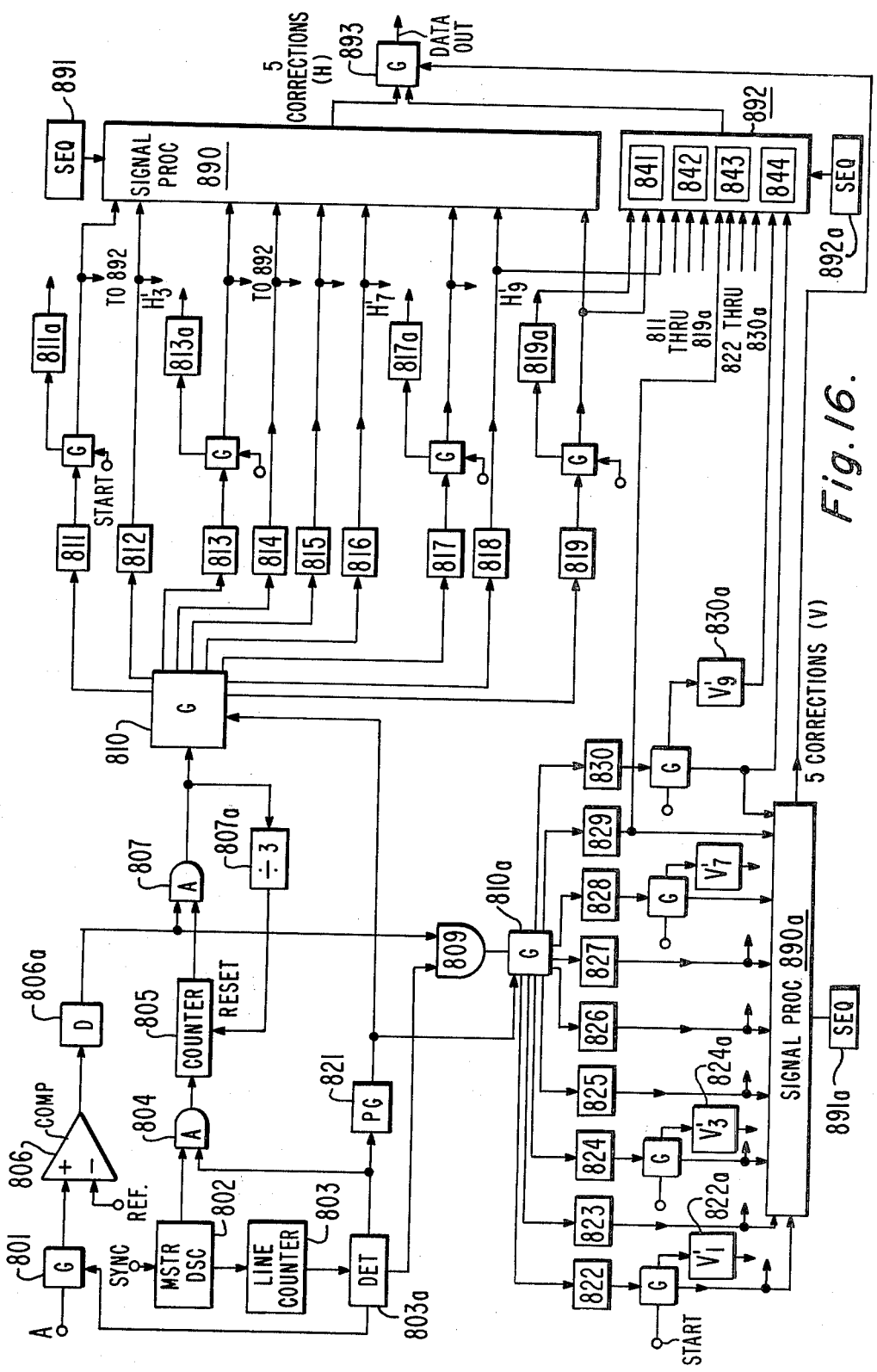
FIG. 16 is a block diagram of the system for measuring and storing the absolute positions of the block marks in FIG. 2 and for providing error correction signals for the green video signal.

Referring to FIG. 16, there is illustrated the system for determining the horizontal and vertical absolute position of the horizontal bar marks 16 as detected in the green video channel for example. Identical circuitry is used to measure the red and blue channel signals. The green video signal at input point A is applied to gate 801. A master oscillator 802 which is responsive to horizontal and vertical sync signals for example, provides counting pulses to a line counter 803 and via AND gate 804 to a horizontal counter 805. When the line counter 803 reaches a count value covering the range predicted for a horizontal line where on the chart one of the rows of bars blocks 16 (see FIG. 2) is located (the regions, 1, 2, and 3, for example), the detector 803a provides an enabling signal to gate 801 for providing the video from point A to a comparator 806. At the other input of comparator 806 is a reference signal indicative of the background or threshold level. When the scan of the video producer 17 reaches the black portion of the blocks 16 (or white if white blocks), the video exceeds that of the reference threshold and an enabling signal is thereby provided to AND gates 807 and 809. The count in the horizontal counter 805 when the gate is enabled indicates the position of the block and hence the absolute horizontal position H of the green video. The output from comparator 806 may be delayed via a delay 806a which prevents an enabling pulse until a time period sufficient that the count at the counter 805 registers the exact center of the block. The counter 805 is then reset after three outputs from AND gate 807. This allows for the counter to remain counting to determine the exact position all three blocks in the same line. This delay until the end of three outputs from gate 807 may be provided by the divide by 3 divider 807a. The line count at counter 803 is enabled via AND gate 809 to provide a line count indicative of the absolute vertical position of the horizontal bar marks 16 as detected in green video channel. A pulse generator 821 in response to the gating signal from detector 803a indicative of the proper line count provides the enabling signal to stepper gate 810. There enabling pulses equally distributed over the horizontal line time period are provided by generator 821 to stepper 810 to coincide with the times of the blocks 16a, 16b, 16c in regions 1, 2, and 3, for example, to thereby permit the counter 805 to register the number of pulse counts of the master oscillator pulses in the latches 811, 812, and 813 and register the vertical positions via stepper gate 810a in latches 822, 823, and 824. The stepper gate 810 in response to the stepping pulses from generator 821 sequences the latches 811 through 819 to store sequentially the measured horizontal positions of the centers of the blocks for all nine regions. For the center regions (4, 5, and 6) only the upper bar 16' is measured. The detected horizontal position of the center of the blocks corresponds to the count from horizontal counter 805. Similarly, the stepper 810a sequentially provides the vertical line count for the nine regions in latches 822 through 830.

The latches 811a, 813a, 817a, and 819a, store the initial detected horizontal location of the center of the blocks of the corner regions. Similarly, the latches 822a, 824a, 828a, and 830a store the initial detected vertical location of the blocks for the corner regions. As mentioned previously, these initial detected points are stored and are represented by the prime numbers $H_1'$, $V_1'$, $H_3'$, $V_3'$, $H_7'$, $V_7'$, $H_9'$, and $V_9'$. Thereafter the corresponding corner gates $G_H$ are switched to provide signals from the latches directly out of the corner latches. Signals stored in the horizontal latches 811 through 819 indicating the detected horizontal position of the marks after the initial measurements are applied simultaneously by strobe pulses applied thereto to the signal processor 890. The signal processor 890 contains five processors which are like processors 303, 304, 305, 306, and 307 discussed previously in connection with the fine registration for processing the $H_1$ through $H_9$ signals in the same manner as the horizontal error signals discussed previously in connection with fine registration to provide from the same $H_1$ through $H_9$ signals the five correction signals of horizontal tilt, horizontal linearity, horizontal bow, horizontal keystone, and horizontal pincushion. These five correction signals are then sequenced by a sequencer 891 through gate 893 (corresponding to gate 28 in FIG. 1) with the proper address to RAM 21 in FIG. 1 to provide automatic geometry correction of the signals for horizontal tilt, horizontal linearity, horizontal bow, horizontal keystone, and horizontal pincushion. Similarly, the $V_1$ through $V_9$ measured position signals from latches 822 through 830 are directly applied simultaneously to signal processor 890a which includes the five processors like that discussed previously in connection with fine registration (310 through 314) for providing vertical tilt, vertical linearity, vertical bow, vertical keystone, and vertical pincushion corrections. These five correction signals are sequenced by a sequencer 891a and applied to the data bus via gate 893 to provide correction for these five corrections in the same manner discussed previously in connection with fine registration. These ten error correction signals for geometry are derived from the same measured information stored in latches 811 through 819 and 822 through 830.

As mentioned previously, the geometry considerations for horizontal centering error, horizontal size error, vertical centering error, and vertical size error require comparison of the initial position to that of the later measured corrected positions. This is provided in the four signal processors 841–844 of unit 892 in FIG. 16. As noted in viewing FIG. 16, the outputs from the latches 811 through 819, 811a, 813a, 817a, 819a, and latches 822 through 830, and latches 822a, 824a, 828a, and 830a are applied to the four signal processors 841 through 844. The signals from latches 811 through 810, 822 through 830, 811a, 813a, 817a, 819a, 822a, 824a, 828a, and 830a, are applied via a matrix simultaneously (by strobe signals from timing control 13 applied to these latches) to the processors 841, 842, 843, and 844 as discussed previously in connection with fine registration. These processors in response to the signals from the previously mentioned latches produce the horizontal and vertical size centering correction errors according to the algorithms in equations 17, 18, 19, and 20 and store these correction signals in output latches. At the appropriate time period provided these four correction signals are applied with the proper address (horizontal size, horizontal centering, etc.) to the RAM 21. As in fine registration, these four geometry correction signals are derived from the regional errors and positons stored in the latches and applied simultaneously to the four different processors which produce the error correction signals for the secondary setup functions in geometry setup.

Figure 17:
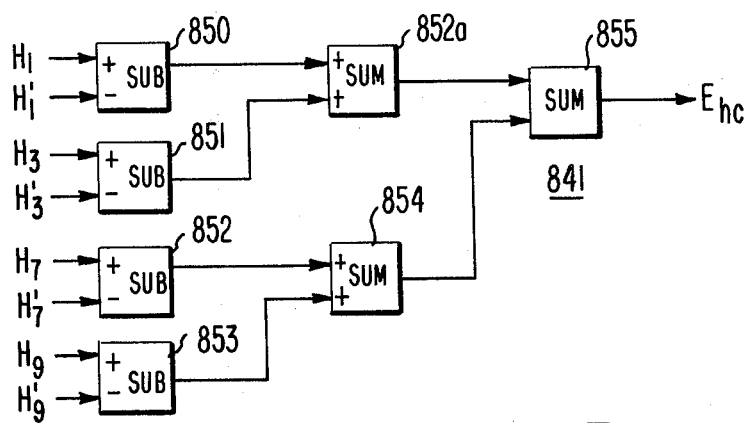
FIG. 17 is a block diagram of the signal processor for obtaining horizontal centering correction in FIG. 16.

Referring to FIG. 17, there is illustratd the processor 841 for providing the horizontal centering correction. The binary signals $H_1'$, $H_3'$, $H_7'$, and $H_9'$ indicating the initial detected corner positions are subtracted from the binary signals $H_1$, $H_3$, $H_7$, and $H_9$ indicating the later measured corner positions in subtractors 850 through 853. These difference signals are summed by binary summers 852a, 854, and 855.

Referring to FIG. 18, there is illustrated the processor 842 for providing horizontal size error correction signal. The binary signals $V_1'$, $V_3'$, $V_7'$, $V_9'$, $H_1'$, $H_3'$, $H_7'$, and $H_9'$ representing the initial detected vertical and horizontal corner positions are substracted from the corresponding binary signals $V_1$, $V_3$, $V_7$, $V_9$, $H_1$, $H_3$, $H_7$, and $H_9$ representing the later measured corner positions in binary subtractors 856, 857, 859, 860, 865, 866, 868, and 869. The vertical difference signals are summed in binary summers 858, 861, and 862 and applied to binary multiplier 863. At multiplier 863 the vertical signals are multiplied by the weighting factor 9/16 Rr from source 864 where R satisfies the aspect ratio EF/EH mentioned previously and r the scaling factor mentioned previously. The horizontal difference signals are summed in binary adders 867, 870, and 871 and are summed with the vertical binary signals from multiplier 863. The vertical centering signal processor 843 is similar to the horizontal centering processor except that the processor is responsive to the stored and new vertical error signals associated with the corner regions. The vertical size processor 844 is similar to the horizontal size processor 842 except that the multiplier is Rr and not 9/16 Rr.

The above described system in connection with FIG. 16 provides the detection of the green video signal and correction of the green video to provide a green signal with optimum geometry. As mentioned previously, to obtain coarse registration the red video signal and the blue video signal are compared region by region with the green video and the difference signals are applied to similar processors to correct red and blue to match the green video signal.

Referring to FIG. 19, the green video signal detected indetector 701 (which corresponds to the detection system in FIG. 16) and corrected as described above provides the horizontal and vertical position signals to the latches 811 through 819 and 822 through 830. These 18 binary signals representing the measured position of the marks for green video in the nine regions is represented by lines $H_{1G}$ through $V_{9G}$ coming out of the green detector 701. A red video detector 703 similar to the green video detector provides at similar 18 latches 18 binary signals identifying the detected position of the marks from red video signal and are represented by $H_{1R}$ through $V_{9R}$ in FIG. 19. The 18 binary signals from the red detector 703 and the 18 binary signals from the green detector 701 are applied to subtractor module 704. Subtractor module 704 includes 18 subtractors 705 through 723. Only subtractors 705, 713, 714, and 723 are shown but there are 14 other subtractors. In subtractor 705 of module 704 for example, the binary signal representing the detected horizontal position of the mark by the green pickup tube in region 1 is subtracted from the binary signal representing the detected horizontal position of mark by red pickup tube in region 1 to thereby provide a horizontal error signal represented by $h_1$. This horizontal binary signal ($h_1$) which is coupled out of this subtractor in module 704 and stored in a corresponding latch 705a to be later applied to a signal processor 733. Similarly, the binary signals representing the detected horizontal position of the marks by the green pickup tube in regions 2 through 9 is subtracted from the binary signals representing the detected horizontal position of the marks by the red pickup tube in the corresponding regions 2 through 9 on a region by region basis in subtractors 706 through 713 to provide the horizontal difference signals $h_2$ through $h_9$ to latches 706a through 73a. Similarly, the binary signals representing the detected vertical position of the marks by the green pickup tube in the regions 1 through 9 is subtracted from the binary signals representing the detected vertical position of the marks by the red pickup tube in the regions 1 through 9 on a region by region basis in subtractors 714 through 723 to provide the nine vertical difference signals $V_1$ through $V_9$ at the latches 714a through 723a. These difference signals are applied simultaneously by a strobe signal (from timing control 13) to the latches and are processed by processors in processor 733 similar to those fourteen processors in the fine registration system. The signal processor 733 includes the processors like that of 301 through 314 in FIG. 8 and latches 301a through 314a to thereby provide when strobed at the output of the signal processor 733 and 14 error correction signals for horizontal centering, horizontal size, horizontal tilt, horizontal linearity, horizontal bow, horizontal keystone, horizontal pincushion, vertical centering, vertical size, vertical tilt, vertical linearity, vertical bow, vertical keystone, and vertical pincushion to the data bus 11. The signal processor 733 may be the same signal processor as used in FIG. 8 for fine registration. The signals from the signal processor are sequenced by sequencer 734 as discussed previously to gating circuitry 28 and the data bus.

Once the red video corrections are made to match the green video signals, the blue video signal is corrected to match the green signal in the same manner discussed above in connection with FIG. 19. As in fine registration regional latches store regional registration errors and these errors are applied selectively and simultaneously to fourteen processors which produce the fourteen correction signals for the fourteen secondary setup functions without any remeasurement between secondary setup function corrections.

The automatic camera system described above may also be utilized to correct for axis shading and level controls using the test chart of FIG. 2. The test chart as illustrated in FIG. 3 may be modified as discussed previously such that the chevron and blocks are represented by white areas on a gray background. The position of the marks in this region is determined by a counter which counts a predetermined time and a predetermined position on the horizontal line for gating the video in approximately the correct time period of the blocks.

Referring to FIG. 20, there is illustrated a diagram for providing the axis shading and level control. The black level adjustment procedure removes or reduces black level errors in the image when the lens is capped. Each point or region in the image yields one black level signal. The absolute black level error in all three images are usually minimized separately instead of minimizing the relative black level errors. The camera system has five independent level setting controls so at least five points should be measured. A better result is obtained in the system as described previously using points from 9 regions and a weighted averaging technique to calculate the control errors. Again, more or fewer points or regions could be examined. The five controls that are used in this system to adjust levels are: horizontal sawtooth, horizontal parabola, vertical sawtooth, vertical parabola, and overall level or gain. Note that these correction controls are well-known in the state of the art wherein the horizontal sawtooth adjusts for the left to right raster level, the vertical sawtooth, the top to bottom raster level, the horizontal parabola, the vertical center level and the vertical parabola, the horizontal center level.

The control errors can be calculated by detected and stored luminance levels or luminance errors represented by $l_n$ where n represents the one of the 9 regions measured. The error correction signals are calculated from these luminance levels or luminance difference signals represented by $l_1$ through $l_9$ by signal processors 762 through 766 for each of the five secondary functions discussed which processors are similar to or the same as those used for calculating some of relative registration errors. The signal processors in the control signal generating means 761 may be represented by the following equations where the horizontal sawtooth control error is given by $$E_{hw}=K_{hw}(l_1-l_3+4l_4-4l_6+l_7-l_9) \tag{21}$$

the horizontal parabola control error is given by
$$E_{ha}=K_{ha}(-l_1+2l_2-l_3-6l_4+12l_5-6l_6-l_7+2l_8-l_9) \tag{22}$$

the vertical sawtooth control error is given by
$$E_{vw}=K_{vw}(l_1+4l_2+l_3-l_7-4l_8-l_9) \tag{23}$$

the vertical parabola control error is given by
$$E_{va}=K_{va}(l_1+6l_2+l_3-2l_4-12l_5-2l_6+l_7+6l_8+l_9) \tag{24}$$

and the overall level or gain error is given by $$E_g=K_g l_5 \tag{25}$$

The processor 762 for horizontal sawtooth is like that for horizontal size (processor 302) in fine registration with all the signs changed. The same processor could be used. The processor 763 for horizontal parabola is identical to that used for horizontal linearity (processor 304) in fine registration. The same processor could be used. The processor 764 for vertical sawtooth is like that of vertical size for fine registration without the signs changed (processor 309), and the processor for vertical parabola 766 is identical to that used for vertical linearity in fine registration (processor 311). The same processor could be used. The processor for overall level or gain is obtained by measuring the center gain which is similar to horizontal centering. The same processor could be used. Basically, the only difference between these processors is the weighting factors or weighting factor $K_{hw}$ for horizontal sawtooth corrects for the sawtooth control loop. $K_{ha}$ represents the weighting factor for horizontal parabola, $K_{vw}$ represents the correction weighting factor for vertical sawtooth and $K_{va}$ provides the weighting factor for vertical parabola. The weighting factor $K_g$ is the weighting factor for the overall control level of the gain.

Referring to FIG. 20, there is illustrated the manner in which the black level axis shading and level control is provided. With the camera lens capped the green video signal black level is measured at terminal 740. The green video signal is gated during the approximate time period of the horizontal bar or block markers 16 at the approximate location of the measuring blocks by line counter 741 which is responsive to horizontal sync. The video is applied to a comparator 742 via gate 743. To the minus reference terminal of comparator 742 is applied a RAMPsignal from RAMP generator 745 via switch 744. The RAMP generator and comparator operate in the similar manner to that described in applicant's co-pending application of Robert Adams Dischert and Robert Earl Flory, entitled, "VIDEO SIGNAL AMPLITUDE REGISTRATION SYSTEM," Ser. No. 841,194, filed Oct. 11, 1977. When the black level exceeds the signal from the reference generator 745, an output signal is provided from comparator 742 to change the state of flip-flop 746. A counter 747 is responsive to clock pulses from clock 748 which begin at the start of the RAMP from generator 745. The clock pulses are normally applied via gate 749 to the counter 747. The flip-flop 746 is normally set at the start of the line period so as to enable the AND gate 749. As the RAMP reference voltage output continues to rise from that point below the minimum expected video (black level from time zero), it intersects the video input of the signal at the input of 740 and causes a change in the output from comparator 742. This changes the state of flip-flop 746 and removes the enabling signal to AND gate 749 and the counter 747 registers the black level at counter 747. The binary signal at counter 747 representing the black level is then sequenced via stepper 750 to the appropriate black level latch 751 through 759. A pulse generator 741a provides three spaced "start" pulses per horizontal line time period. The pulse generator 741 includes a detector responsive to the appropriate horizontal line count for enabling the gate 743, setting flip-flop 746, resetting clock 748, and operating stepper switch 750 for registering the amplitude levels in the nine regions to the latches 751 through 759 of module 700. The setting of flip-flop 746 resets the counter 747. These black levels for each of the nine regions are compared region by region to a reference black level setting and each black level error signal is stored in separate latches and are applied simultaneously via gate 760 to the signal processor unit 761. The comparators are comparators 751a through 759a and the storage latches for the errors are latches 751b through 759b. The signal processor 761 includes the horizontal sawtooth processor 762, the horizontal parabola processor 763, the vertical sawtooth processor 764, the vertical parabola processor 765, and the overall gain processor 766. The processors 762 through 766 respond simultaneously to the appropriate nine black level error signals strobed from the nine regions by strobe signals to the nine latches 751b through 759b for generating the five correction control signals which are then applied via the data bus 11 in the proper sequences to the camera processor RAM 21 as discussed previously to correct the green black video level across the total raster of the camera to match the selected reference black level.

Similarly, the black level of red video signal is detected in detector 767 having a black level detector and nine storage latches nine comparators and nine error storage latches in module 767a. The red video amplitude level detector 767 including module 700 is identical to the green video level detector discussed above. The black level error signals from the red video signal stored in latches 767a are coupled simultaneously via the gate 760 in sequence to the same signal processor 761 to provide from the processors 762 through 765 the five black level correction signals to adjust the red video black level in the camera. Similarly, a blue video detector 768 includes a blud video amplitude level detector identical to the green level detector and black level module 768a for storing the detected black level comparing to the reference black level and storing the black level error signal which is detected in th same manner discussed above in connection with the green video signal. These black video level error signals stored for each of the nine regions are coupled simultaneously via gate 760 at the right time period to the signal processors 762 through 766 which generates the five correction control signals to the camera for adjusting the blue, black video level in the camera to match the selected black level.

The next step for white shading adjustment includes the modulation shading for green video signal. The white level is selected for the center region or region 5.

This may be accomplished by a potentiometer 775a which selects the level which is converted to a binary signal in an analog-to-digital converter 775b for example and this selected binary level signal is stored in a latch 775 of white latch module 770. There are, for example, nine white level latches, 771 through 779 in white latch module 770 - one for each region. As mentioned previously, a white level is set for the center region or region 5 in latch 775. This white level is converted via a D/A converter 769 and applied as a reference level to switch 774. This reference level is then compared at comparator 742 by selecting the appropriate position of switch 744. This is done by a sequence signal from unit 13. At the comparator 742 with the video lens uncapped the white levels from the chart are compared with the selected white levels at the center region to derive a difference level which is registered in counter 747 by counting the number of clock pulses from clock 748. The clock 748, as mentioned previously, is gated on at the approximate time of the horizontal "white" block or bar markets 16. The registered level of counter 747 is applied via stepper switch 750 to the appropriate white level latches 771 through 779. The stepper switch 750 in response to a separate command from the timing control unit 13 indicating a modulation shading adjustment will proceed after black level control levels are completed to switch the counter 747 output to the appropriate white level latches. The white level difference signals in latches 771 through 779 (nine regions) are applied simultaneously to the four signal processors 762 through 765 in module 761 for generating the four correction signals of horizontal and vertical sawtooth correction and horizontal and vertical parabola correction. The fifth processor 766 is disabled for the shading adjustment.

Once this is completed and the shading errors in the green image are corrected, the red video white levels are compared with the green white levels and these difference signals are applied to the signal processor module 761 to correct the red video to match the green video. The comparision of the red video and green video is like that described for example in the previously cited application of Dischert and Flory, entitled "VIDEO SIGNAL AMPLITUDE REGISTRATION SYSTEM," Ser. No. 841,194. The same generated signal is applied to both the green and the red video detectors via switch 744. Common clock pulses are provided by clock 748. The detected green white level video signals (stored in latches 771 through 779) are compared on a region by region basis with the red white level signals (stored in 9 latches 767b) in the corresponding nine locations in a comparator 781. These detected levels are compared region by region so that they produce nine difference signals for the nine regions which nine difference signals are stored sequentially in nine latches 782. For the purpose of simplicity, only the upper bar marks 16 are gated for regions 4, 5, and 6. These red to green difference signals are then applied simultaneously to the five processors 762 through 766 in processor 761 to produce the five error correction signals for correcting the red video to match the green video. Similarly, the same RAMP generated signal is applied to both the green and blue video detectors via switch 744. Common clock pulses are provided by clock 748. The detected green white level video signals (stored in latches 771 through 779) are compared region by region in comparator 783 and with the nine blue white level signals being sotred in the nine latches 768b.

The nine difference signals are then applied simultaneously to the signal processor 741 via gate 760 for generating the five error correction signals for horizontal and vertical sawtooth, horizontal and vertical parabola, and gain so that the blue video matches the green video. In this manner, all the black level and shading adjustments are automatically provided. The light level errors for the nine regions are stored in latches and as in fine registration the stored regional level errors are applied simultaneously to the four or five processors corresponding to the four or five secondary setup functions to be corrected.

It is understood that the automatic setup described is only by way of example and is recognized that the processing may be done using a microprocessor such as CDP 1802 Microprocessor of RCA Corporation. The microprocessor would be used in place of the latches, the processors, the ROM's, and perform the switching. The microprocessor does the timing and knows when to put data out into the lines. The microprocessor system would include RAM and a ROM. The input would be from function timing 25 and comes in as a code. The microprocessor sees this code, looks at the ROM, and looks for the appropriate address for that code, then sends the appropriate address to the RAM. The microprocessor operates functionally in the manners described above using a software program, holds the appropriate data stored in its memory which functions as the latches in the foregoing description, performs the operations of the signal processors described previously to provide the error correction signals which are then sequenced by the ROM with appropriate address back to the data bus 11.

What is claimed is:

1. A system for automatic adjustment of a television camera, comprising:
   means coupled to said camera and responsive to the video signals therefrom at a plurality of regions of the television raster for providing simultaneously a plurality of signals each representing the detected video signal from different regions of the television raster,
   second means coupled to said first means and responsive to the signals simultaneously provided for selectively and separately processing said detected signals without reexamining the video signal for providing a plurality of corresponding camera adjustment signals, and
   means coupled to said camera and responsive to said adjustment signals for adjusting said camera.

2. The combination of claim 1 wherein said camera is a color television camera and said first means includes means responsive to two color video signals from each of the regions for providing difference signals from each region representing the error in the registration between the two color video signals.

3. The combination of claim 1 wherein the camera lens is capped and wherein said first means includes means for measuring the black level at said regions.

4. The combination of claim 1 wherein said camera is viewing a test chart having identical test marks at each region and said first means includes means for measuring the detected position of the marks at the output of the camera at each region and storing the position information until it can be simultaneously provided and said second means includes means responsive to the detected position information of the marks in each region for providing said plurality of adjustment signals.

5. The combination of claim 1 wherein the number of regions exceeds the minimum number required for providing the adjustments and said second means includes means for weighting the signals from some of the regions in a predetermined manner.

6. The combination of claim 5 wherein the number of regions is nine with nine marks in the chart arranged in a 3×3 array - 3 columns of three in a row.

7. The combination of claim 1 including means for summing said camera adjustment signals for controlling stopping of the adjustments.

8. The combination of claim 1 wherein said first means includes means for storing signals representing the initial detected position of the corners.

9. The combination of claim 1 wherein said second means includes means responsive to only the amplitude level signals from the center region for providing overall level or gain error signals.

10. A system for automatic adjustment of a color television camera for correcting for registration errors between two color video signals with said camera viewing a test chart having a plurality of identical test marks equally distributed in rows and columns, comprising:

first means including measuring means coupled to said camera and responsive to said two color video signals for providing simultaneously horizontal and vertical error signals associated with each of the identical marks representing in each mark location the horizontal and vertical positional errors between the two video signals, second means coupled to said first means and responsive to said horizontal and vertical error signals from each mark location for selectively and separately processing said error signals for horizontal centering, horizontal size, horizontal bow, horizontal tilt and horizontal linearity, vertical centering, vertical size, vertical bow, vertical tilt and vertical linearity, without remeasuring the errors for providing separate camera adjustment signals for horizontal centering, horizontal size, horizontal bow, horizontal tilt and horizontal linearity, vertical centering, vertical size, vertical bow, vertical tilt and vertical linearity, and third means coupled to said camera and responsive to the adjustment signals for adjusting said camera according to all of said adjustment signals before remeasuring for errors.

11. The combination of claim 10 wherein the number of said test marks exceeds the minimum number for producing said camera adjustment signals and said second means includes means for weighting the error signals near the center of the raster.

12. A system for automatic white shading adjustment of a television camera when viewing a test chart having a plurality of identical test marks distributed about different regions of the chart with one corresponding to the center of the television raster, comprising:

first means for selecting the white level at the center of the raster, second means for detecting the white level setting at the center of the raster, third means coupled to said second means for comparing the white level detected from the center of the raster with the white level associated with the other test mark positions other than the center of the raster and for providing simultaneously detected difference signals from the different regions of the raster, means responsive to the detected difference signals for separately and selectively processing said difference signals for horizontal and vertical sawtooth correction and horizontal and vertical parabola correction to produce corresponding horizontal and vertical sawtooth correction signals and horizontal and vertical parabola correction signals to adjust the shading level of the entire raster to match the selected white level at the center of the raster, and means coupled to said camera and responsive to said correction signals for adjusting said camera according to said correction signals.

13. A system for automatic black level adjustment of a television camera with the camera lens capped, comprising:

means coupled to said camera and responsive to the black level signals therefrom at different distributed regions of the television raster including the center region and regions on either horizontal and vertical sides of center for first signals representing the absolute amplitude level of the video signals from the different regions, second means for providing a reference black level, third means coupled to said first and second means for comparing said first signals with said reference black level for simultaneously providing a plurality of second signals each representing the difference or error signal between the detected absolute black level and the reference black level, fourth means coupled to said third means responsive to the plurlaity of second signals simultaneously provided for selectively and separately processing said signals for providing black level correction signals for horizontal and vertical sawtooth errors, horizontal and vertical parabola errors and overall gain error to correct the black level of the total raster to match the black level of the reference, and means coupled to said camera and responsive to said correction signals for adjusting the black level of said camera to match said reference.

14. A system for automatic adjustment of the white level from a first color video pick-up device to match the white level from a second color video pick-up device of a color television camera when the camera is viewing a test chart having identical marks at a plurality of regions which includes the center of the test chart and regions on either vertical and horizontal sides of the center, comprising:

means coupled to said first and second camera devices and responsive to the video signals therefrom at the plurality regions of the television raster corresponding to the test chart regions for providing simultaneously the amplitude difference signals from each of said regions, second means coupled to said first means responsive simultaneously to the amplitude difference signals from each of the regions for selectively and separately processing said signals for providing horizontal and vertical sawtooth error correction signals, horizontal and vertical parabola correction signals and an overall gain correction signal to adjust the video associated with the second video pick-up device to match the first, and means coupled to said camera and responsive to said error correction signals for adjusting one video white level to match the other.

15. A system for automatic adjustment of a color television camera when said camera is viewing a test chart having a plurality of identical test marks distributed in rows and columns, comprising:

means coupled to said camera and responsive to the video signals therefrom for measuring and storing the initial detected position of the four corner marks when the active area of the pick-up device of said camera is aligned with the test chart, first means coupled to said camera and responsive to the video output therefrom for measuring and providing simultaneously horizontal and vertical position location signals with respect to the edges of the scanned areas of the raster for each mark location, second means responsive to said position location signals associated with the mark locations for providing a plurality of geometry correction signals, third means responsive to said geometry correction signals for adjusting said camera, fourth means coupled to said second means and said first means and responsive to the position of the four corner marks before and after geometry adjustment for providing horizontal and vertical size and centering correction signals to maintain alignment of the corners of the raster with the active area of the pick-up device.

16. The combination of claim 15 wherein said number of identical test marks is nine arranged in a $3 \times 3$ array of 3 columns of 3 in each row.

17. The combination of claim 16 wherein said second means includes means responsive to the position location signals for said nine locations for separately and selectively processing said position signals for horizontal centering, horizontal size, horizontal bow, horizontal tilt, horizontal linearity, horizontal pincushion, horizontal keystone, vertical centering, vertical size, vertical bow, vertical tilt, vertical linearity, vertical pincushion, and vertical keystone without remeasuring the positions and giving additional weight values to the position signals near the center of the raster.

* * * * *

UNITED STATES PATENT AND TRADEMARK OFFICE
CERTIFICATE OF CORRECTION

PATENT NO. : 4,234,890

DATED : November 18, 1980

INVENTOR(S) : Brian Astle, et al.

It is certified that error appears in the above-identified patent and that said Letters Patent is hereby corrected as shown below:

Column 5, line 21, that portion reading "command" should read -- summed --; Column 9, line 56, that portion reading "$E_{h1}$" should read -- $E_{hb}$ --; Column 13, line 2, that portion reading "310a" should read -- 301a --; line 64, delete "E.(15)"; line 67, after "and" insert -- E. -- and at the margin insert -- (15) --; Column 15, line 28, that portion reading "There" should read -- Three --; Column 16, line 32, that portion reading "810" should read -- 819 --; Column 17, line 60, that portion reading "73a" should read -- 713a --; Column 18, line 64, that portion reading "$1_n$" should read -- $L_n$ --; Column 19, line 10, that portion reading "$1_9 2)$" should read -- $1_9)$ (22) --.

Signed and Sealed this

Twenty-fourth Day of February 1981

[SEAL]

Attest:

RENE D. TEGTMEYER

Attesting Officer  Acting Commissioner of Patents and Trademarks